(12) United States Patent
Kamio

(10) Patent No.: US 8,662,042 B2
(45) Date of Patent: Mar. 4, 2014

(54) CONTROLLER FOR INTERNAL-COMBUSTION ENGINE

(71) Applicant: Honda Motor Co., Ltd., Tokyo (JP)

(72) Inventor: Junichi Kamio, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/735,217

(22) Filed: Jan. 7, 2013

(65) Prior Publication Data

US 2013/0180485 A1 Jul. 18, 2013

(30) Foreign Application Priority Data

Jan. 13, 2012 (JP) ................... 2012-005610

(51) Int. Cl.
*F01L 1/34* (2006.01)
*F01L 1/344* (2006.01)

(52) U.S. Cl.
CPC .................... *F01L 1/3442* (2013.01)
USPC ..................................... 123/90.17

(58) Field of Classification Search
CPC ..................................... F01L 1/3442
USPC .................. 123/90.15, 90.17, 90.31
See application file for complete search history.

(56) References Cited

U.S. PATENT DOCUMENTS 6,530,351 B2 * 3/2003 Mikame ............... 123/90.15

FOREIGN PATENT DOCUMENTS

JP        2005-180306 A        7/2005

* cited by examiner

*Primary Examiner* — Zelalem Eshete
(74) *Attorney, Agent, or Firm* — Squire Sanders (US) LLP

(57) ABSTRACT

A controller for an internal-combustion engine 1 has an intake cam 13L for a low load operation and an intake cam 13H for a high load operation. The controller switches the intake cam used to actually open/close an intake valve 8 and changes the phase angle of each intake cam according to the load on an internal-combustion engine while the internal-combustion engine 1 is in operation. At a startup of the internal-combustion engine 1, the controller holds the intake cam 13H for a high load operation as the intake cam that actually opens/closes the intake valve 8, and changes the phase angle of the intake cam 13H according to the temperature of the internal-combustion engine 1 and/or the temperature of the atmosphere.

6 Claims, 10 Drawing Sheets

CONTROLLER FOR INTERNAL-COMBUSTION ENGINE

BACKGROUND OF THE INVENTION

1. Field of the Invention

The present invention relates to a controller for an internal-combustion engine capable of varying an open valve period and a lift amount of an intake valve.

2. Description of the Related Art

There has conventionally been known a controller for an internal-combustion engine which has been disclosed in, for example, Japanese Patent Application Laid-Open No. 2005-180306 (hereinafter referred to as patent document 1) and which is provided with, as intake cams used for opening/closing an intake valve, a plurality of intake cams having different profiles that specify the angle width and the lift amount in an open valve period of the intake valve. The controller is constructed such that the phase angles of the intake cams relative to the phase angle of a crankshaft (the output shaft of the internal-combustion engine) can be changed within a predetermined angle range.

In this type of internal-combustion engine, the intake cam used to actually open/close the intake valve is selectively switched by a valve lift changing mechanism, such as VTEC (a registered trademark), to variably change the angle width and the lift amount of the intake valve in the open valve period.

Further, the phase angle of each of the intake cams relative to the phase angle of the crankshaft (the output shaft of the internal-combustion engine) is continuously changed by a valve phase changing mechanism, such as VTC, thereby to change the phase angle in the open valve period of an intake valve (a pair of the phase angle at a valve opening start and the phase angle at a valve opening end) driven by each of the intake cams.

For example, the controller for an internal-combustion engine disclosed in patent document 1 has three intake cams, switches among the intake cams, and changes the phase angle of each intake cam according to the load on the internal-combustion engine. In this case, the switching among the intake cams is implemented such that the angle width and the lift amount of the intake valve in the open valve period increase as the load on the internal-combustion engine increases. Further, when the intake valve is driven to open/close by each of the intake cams, the phase angle of each of the intake cams is changed such that the phase angle at the start of the opening of the intake valve approaches the phase angle at a top dead center (TDC) from a phase angle on a lead angle side relative to the phase angle at the top dead center as the load on the internal-combustion engine increases.

In the controller for an internal-combustion engine disclosed in patent document 1, when switching among the intake cams, which open/close the intake valve, is implemented, the phase angle of an intake cam on a low load side, at which the angle width and the lift amount of the intake valve in the open valve period are small, is controlled to a phase angle that causes the phase angle at the opening start of the intake valve defined thereby to substantially coincide with the phase angle at the top dead center (TDC). Further, the phase angle of an intake cam on a high load side, at which the angle width and the lift amount of the intake valve in the open valve period are large, is controlled to a phase angle that causes the phase angle at the opening start of the intake valve defined thereby to advance to become larger than the phase angle at the top dead center (TDC).

In this case, an unsmooth change in the output of the internal-combustion engine can be reduced at the time of the switching among the intake cams. However, in a situation wherein the intake cam on the high load side is operated to open/close the intake valve in the vicinity of a load where the intake cam switching is carried out, the intake valve will open at a relatively large opening degree in an exhaust stroke. Accordingly, the amount of an exhaust gas charged together with air into the combustion chamber during an intake stroke following the exhaust stroke tends to suddenly change. This may cause a misfire or the like, resulting in deteriorated output performance of the internal-combustion engine.

An internal-combustion engine used as a motive power source of a vehicle or the like is generally required to operate under a variety of environmental conditions, so that the internal-combustion engine is desired to be capable of achieving a successful startup at a variety of ambient temperatures and atmospheric pressures.

In this case, various experiments and studies carried out by the inventors of the present application have revealed that whichever intake cam selected for driving the intake valve at the time of starting up the internal-combustion engine influences the startability of the internal-combustion engine. For this reason, when starting up the internal-combustion engine, it is desired to properly select the intake cam used for driving the intake valve at the startup of the internal-combustion engine.

SUMMARY OF THE INVENTION

The present invention has been made with a view toward the background described above, and it is an object of the invention to provide a controller capable of properly starting up an internal-combustion engine under a variety of environmental conditions by a system having a first intake cam and a second intake cam. A further object of the present invention is to provide a controller capable of successfully operating an internal-combustion engine while restraining the occurrence of misfires or the like under a variety of environmental conditions also during the operation of the internal-combustion engine after a startup.

To these ends, a controller for an internal-combustion engine according to the present invention includes:

an intake valve driving mechanism that has a first intake cam and a second intake cam selectively used to open/close an intake valve, a valve lift changing mechanism that selectively switches an actual driving intake cam, which is an intake cam actually opening/closing the intake valve, to either the first intake cam or the second intake cam, and a valve phase changing mechanism that changes the phase angles of the first and the second intake cams relative to the phase angle of a crankshaft, the profiles of the first and the second intake cams being set such that, in the case where the intake valve is opened/closed by the first intake cam, the lift amount of the intake valve and the angle width of an open valve period are both larger than those in the case where the intake valve is opened/closed by the second intake cam, the profiles of the first and the second intake cams being set such that the angle width in the open valve period of the intake valve driven by the second intake cam becomes an angle width that is smaller than an angle width between a top dead center and a bottom dead center and the angle width in the open valve period of the intake valve driven by the first intake cam becomes an angle width that is closer to the angle width between the top dead center and the bottom dead center than the angle width in the open valve period of the intake valve driven by the second intake cam, an intake cam switching control unit, which defines the first intake cam out of the first and the second intake cams as the intake cam for a high load operation of the internal-combustion engine and defines the second intake cam as the intake cam for a low load operation of the internal-combustion engine, controls the valve lift changing mechanism to switch the actual driving intake cam according to the load on the internal-combustion engine while the internal-combustion engine is in operation, and holds the first intake cam as the actual driving intake cam by the valve lift changing mechanism at the time of starting up the internal-combustion engine; and a cam phase control unit, which controls the valve phase changing mechanism to change the phase angle of the actual driving intake cam according to the load on the internal-combustion engine while the internal-combustion engine is in operation, and controls the valve phase changing mechanism to change the phase angle of the actual driving intake cam in a predetermined pattern according to at least one of a temperature of the internal-combustion engine, the temperature of the atmosphere, and the pressure of the atmosphere at the time of starting up the internal-combustion engine, wherein, during operation of the internal-combustion engine, the cam phase control unit controls the valve phase changing mechanism such that, at the time of opening/closing the intake valve by the first intake cam, the phase angle at the start of the opening of the intake valve changes in a lead angle direction within a range between a predetermined first lag angle side valve opening start phase angle that is on the lag angle side relative to the top dead center and on a lead angle side relative to the bottom dead center and a predetermined first lead angle side valve opening start phase angle that is on the lead angle side relative to the first lag angle side valve opening start phase angle as the load on the internal-combustion engine increases, and also controls the valve phase changing mechanism such that, at the time of opening/closing the intake valve by the second intake cam, the phase angle at the start of the opening of the intake valve changes in a lag angle direction within a range between a predetermined second lag angle side valve opening start phase angle that is on a lag angle side relative to the top dead center and on the lead angle side relative to the bottom dead center and a predetermined second lead angle side valve opening start phase angle on the lead angle side relative to the second lag angle side valve opening start phase angle as the load on the internal-combustion engine increases, the intake cam switching control unit switches the actual driving intake cam in a specific state, in which the phase angle of the first intake cam and the phase angle of the second intake cam are controlled such that a phase angle at a start of opening of the intake valve by the first intake cam agrees with the first lag angle side valve opening start phase angle, and that a phase angle at a start of opening of the intake valve by the second intake cam agrees with the second lag angle side valve opening start phase angle while the internal-combustion engine is in operation, the first lag angle side valve opening start phase angle and the first lead angle side valve opening start phase angle are set beforehand such that the effective compression ratio of a combustion chamber of the internal-combustion engine increases as the phase angle at the opening start of the intake valve changes in the lead angle direction within the range between the first lag angle side valve opening start phase angle and the first lead angle side valve opening start phase angle, and the second lag angle side valve opening start phase angle and the second lead angle side valve opening start phase angle are set beforehand such that the effective compression ratio of the combustion chamber increases as the phase angle at the opening start of the intake valve changes in the lag angle direction within the range between the second lag angle side valve opening start phase angle and the second lead angle side valve opening start phase angle (a first aspect of the invention).

In the present invention, the phase angle of the first intake cam or the second intake cam, or the phase angle at the valve opening start or the valve opening end of the intake valve means a phase angle relative to the phase angle (rotational angle position) of the crankshaft (output shaft) of the internal-combustion engine, that is, a relative angle indicated using a certain rotational angle position of the crankshaft (e.g., the rotational angle position corresponding to a top dead center or a bottom dead center of a piston) used as the reference. The angle width in the open valve period of the intake valve means the difference between the phase angle at the valve opening start and the phase angle at the valve opening end.

Further, the effective compression ratio of the combustion chamber of the internal-combustion engine means the ratio of the total volume of the combustion chamber of the internal-combustion engine (the volume of each cylinder) at the valve opening end of the intake valve with respect to the total volume of the combustion chamber at the top dead center.

The above definitions of the meanings are not limited to the first aspect of the invention, but will apply to the remaining aspects of the invention.

According to the first aspect of the invention, while the internal-combustion engine is in operation, when the intake valve is opened/closed by the second intake cam serving as the intake cam for the low load operation of the internal-combustion engine, the valve phase changing mechanism is controlled such that the phase angle at the start of the opening of the intake valve by the second intake cam changes in the lag angle direction within the range between the second lag angle side valve opening start phase angle and the second lead angle side valve opening start phase angle as the load on the internal-combustion engine increases.

In this case, the angle width in the open valve period of the intake valve driven by the second intake cam is smaller than an angle width between the top dead center and the bottom dead center, namely, 180 degrees, thus making it possible to set the phase angle at the opening end of the intake valve to be a phase angle on the lead angle side relative to the bottom dead center. This permits the Atkinson-cycle (Miller-cycle) operation of the internal-combustion engine, in which the effective compression ratio is smaller than an expansion ratio when the intake valve is opened/closed by the second intake cam.

Further, the second lag angle side valve opening start phase angle and the second lead angle side valve opening start phase angle are to be properly set beforehand. This makes it possible to increase the effective compression ratio of the combustion chamber of the internal-combustion engine while changing the phase angle at the opening end of the intake valve from the lead angle side toward the phase angle at the bottom dead center as the phase angle at the start of the opening of the intake valve by the second intake cam is changed in the lag angle direction from the second lead angle side valve opening start phase angle to the second lag angle side valve opening start phase angle (to consequently change the whole open valve period of the intake valve in the lag angle direction). As a result, the amount of air charged into the combustion chamber of the internal-combustion engine can be increased in the open valve period of the intake valve as the load on the internal-combustion engine increases while the internal-combustion engine is in operation.

Further, while the internal-combustion engine is in operation, the valve phase changing mechanism is controlled such that, at the time of opening/closing the intake valve by the first intake cam serving as the intake cam for the high load operation of the internal-combustion engine, the phase angle at the start of the opening of the intake valve by the first intake cam is changed in the lead angle direction within a range between the first lag angle side valve opening start phase angle and the first lead angle side valve opening start phase angle as the load on the internal-combustion engine increases.

In this case, the angle width in the open valve period of the intake valve driven by the first intake cam is larger than the angle width in the open valve period of the intake valve driven by the second intake cam, thus making it possible to set the phase angle at the valve opening end of the intake valve to be a phase angle on the lag angle side relative to the bottom dead center. This permits the Atkinson-cycle (Miller-cycle) operation of the internal-combustion engine, in which the effective compression ratio is smaller than an expansion ratio also when the intake valve is opened/closed by the first intake cam.

Further, the first lag angle side valve opening start phase angle and the first lead angle side valve opening start phase angle are to be properly set beforehand. This makes it possible to increase the effective compression ratio of the combustion chamber of the internal-combustion engine in the open valve period of the intake valve while changing the phase angle at the opening end of the intake valve from the lag angle side toward a phase angle at the bottom dead center as the phase angle at the start of the opening of the intake valve by the first intake cam is changed in the lead angle direction from the first lag angle side valve opening start phase angle to the first lead angle side valve opening start phase angle (to consequently change the whole open valve period of the intake valve in the lead angle direction). As a result, the amount of air charged into the combustion chamber of the internal-combustion engine during the open valve period of the intake valve can be increased as the load on the internal-combustion engine increases while the internal-combustion engine is in operation.

Further, according to the first aspect of the invention, the intake cam switching control unit switches the actual driving intake cam in the aforesaid specific state while the internal-combustion engine is in operation. The phase angle at the start of the opening of the intake valve by the second intake cam in the specific state is an utmost phase angle on a lag angle side in the range between the second lead angle side valve opening start phase angle and the second lag angle side valve opening start phase angle (i.e., the second lag angle side valve opening start phase angle). The phase angle at the start of the opening of the intake valve by the first intake cam in the specific state is an utmost phase angle on the lag angle side in the range between the first lead angle side valve opening start phase angle and the first lag angle side valve opening start phase angle (i.e., the first lag angle side valve opening start phase angle).

Therefore, the actual driving intake cam can be promptly switched without causing a sudden change in the phase angle of each intake cam in the specific state while the load on the internal-combustion engine is increasing or decreasing.

Further, the phase angle at the start of the opening of the intake valve when the actual driving intake cam is switched, namely, the first lag angle side valve opening start phase angle or the second lag angle side valve opening start phase angle, is a phase angle between the top dead center and the bottom dead center. This obviates a sudden change in the amount of an exhaust gas (an exhaust gas recirculated by an EGR apparatus) charged together with air into the combustion chamber during the open valve period of the intake valve before and after the actual driving intake cam is switched. Consequently, the occurrence of a misfire is restrained.

According to the first aspect of the present invention, the intake cam switching control unit holds the first intake cam as the actual driving intake cam by the valve lift changing mechanism at the time of starting up the internal-combustion engine. In addition, the cam phase control unit controls the valve phase changing mechanism to change the phase angle of the first intake cam serving as the actual driving intake cam in a predetermined pattern according to at least one of the temperature of the internal-combustion engine, the temperature of the atmosphere and the pressure of the atmosphere at the time of starting up the internal-combustion engine.

The comparison between the case where the second intake cam is used as the actual driving intake cam at the startup of the internal-combustion engine and the case where the first intake cam is used as the actual driving intake cam at the startup of the internal-combustion engine reveals that the effective compression ratio of the combustion chamber of the internal-combustion engine in the former case is smaller than that in the latter case.

Hence, if the internal-combustion engine were started up by using the second intake cam as the actual driving intake cam in an environment wherein the temperature of the internal-combustion engine or the temperature of the atmosphere is relatively low, or in an environment wherein the atmospheric pressure is relatively low (e.g. a place at a high altitude), then there would likely be a situation in which the temperature will not rise to be sufficiently high in a condition where the air charged into the combustion chamber with the intake valve opened, the air being compressed. This tends to lead to a combustion failure of a fuel mixed in the air, such as a misfire.

According to the first aspect of the invention, therefore, the first intake cam is held to be the actual driving intake cam by the valve lift changing mechanism when starting up the internal-combustion engine, as described above. In this case, the ignition performance of the fuel in the combustion chamber of the internal-combustion engine tends to be subjected especially to the influence of the temperature of the internal-combustion engine, the temperature of the atmosphere, or the pressure of the atmosphere. Therefore, the phase angle of the first intake cam serving as the actual driving intake cam is changed in a predetermined pattern according to at least one of the temperature of the internal-combustion engine, the temperature of the atmosphere, and the pressure of the atmosphere.

With this arrangement, the first aspect of the invention makes it possible to successfully start burning of the fuel in the combustion chamber at the time of the startup of the internal-combustion engine under a variety of environmental conditions related to the temperature of the internal-combustion engine, the temperature of the atmosphere, or the pressure of the atmosphere. As a result, a smooth startup of the internal-combustion engine can be accomplished.

According to the first aspect of the invention, therefore, the switching between the intake cams can be carried out while restraining the occurrence of a misfire or the like during the operation of the internal-combustion engine, and the internal-combustion engine can be properly started up under a variety of environmental conditions.

In the first aspect of the invention, the first lag angle side valve opening start phase angle and the second lag angle side valve opening start phase angle may of course be different from each other or may be the same. Similarly, the first lead angle side valve opening start phase angle and the second lead angle side valve opening start phase angle may be different from each other or may be the same.

In the first aspect of the invention, preferably, the cam phase control unit is capable of controlling the valve phase changing mechanism to change the phase angle of the actual driving intake cam according to at least one of the temperature of the internal-combustion engine and the temperature of the atmosphere at the time of starting up the internal-combustion engine, and also controls the valve phase changing mechanism according to at least one of the temperature of the internal-combustion engine and the temperature of the atmosphere such that the effective compression ratio of the combustion chamber defined by the phase angle of the actual driving intake cam is larger in the case where the temperature of the internal-combustion engine or the temperature of the atmosphere at the startup of the internal-combustion engine is relatively low than in the case where the temperature of the internal-combustion engine or the temperature of the atmosphere at the startup of the internal-combustion engine is relatively high (a second aspect of the invention).

According to the second aspect of the invention, if the temperature of the internal-combustion engine or the temperature of the atmosphere is on a low temperature side at the time of starting up the internal-combustion engine, then the phase angle of the actual driving intake cam is controlled through the intermediary of the valve phase changing mechanism such that the effective compression ratio of the combustion chamber defined by the phase angle of the actual driving intake cam (the first intake cam) becomes relatively large. Hence, the temperature of the air charged into the combustion chamber of the internal-combustion engine easily rises due to the compression at the time of starting up the internal-combustion engine. This makes it possible to start up the internal-combustion engine while preventing the occurrence of a misfire of the fuel mixed in the air.

Further, if the temperature of the internal-combustion engine or the temperature of the atmosphere is on a high temperature side at the time of starting up the internal-combustion engine, then the phase angle of the actual driving intake cam is controlled through the intermediary of the valve phase changing mechanism such that the effective compression ratio of the combustion chamber defined by the phase angle of the actual driving intake cam (the first intake cam) becomes relatively small. This prevents the temperature of the air charged into the combustion chamber of the internal-combustion engine from excessively rising due to the compression. As a result, the internal-combustion engine can be started up while preventing the occurrence of knocking caused by abnormal combustion of a fuel mixed in the air.

In the first aspect and the second aspect of the invention, preferably, the cam phase control unit is capable of controlling the valve phase changing mechanism to change the phase angle of the actual driving intake cam according to the pressure of the atmosphere at the time of starting up the internal-combustion engine, and also controls the valve phase changing mechanism according to the pressure of the atmosphere such that the effective compression ratio of the combustion chamber defined by the phase angle of the actual driving intake cam is larger in the case where the pressure of the atmosphere at the startup of the internal-combustion engine is relatively low than in the case where the pressure of the atmosphere at the startup of the internal-combustion engine is relatively high (a third aspect of the invention).

According to the third aspect of the invention, if the pressure of the atmosphere is on a low pressure side at the time of starting up the internal-combustion engine (e.g., in a place at a high altitude), then the phase angle of the actual driving intake cam is controlled through the intermediary of the valve phase changing mechanism such that the effective compression ratio of the combustion chamber defined by the phase angle of the actual driving intake cam (the first intake cam) becomes relatively large. Hence, the temperature of the air charged into the combustion chamber of the internal-combustion engine easily rises due to the compression even in an environment where the pressure of the atmosphere is relatively low. This makes it possible to start up the internal-combustion engine while preventing the occurrence of a misfire of the fuel mixed in the air.

Further, if the pressure of the atmosphere at the time of starting up the internal-combustion engine is not on the low pressure side (e.g., in a standard atmospheric pressure environment), then the phase angle of the actual driving intake cam is controlled through the intermediary of the valve phase changing mechanism such that the effective compression ratio of the combustion chamber defined by the phase angle of the actual driving intake cam (the first intake cam) becomes relatively small. This prevents the temperature of the air charged into the combustion chamber of the internal-combustion engine from excessively rising due to the compression. As a result, the internal-combustion engine can be started up while preventing the occurrence of knocking caused by abnormal combustion of a fuel mixed in the air.

Further, in the first to the third aspects of the invention, the switching of the actual driving intake cam may be restricted, as necessary, also while the internal-combustion engine is in operation.

More specifically, the intake cam switching control unit may hold the first intake cam as the actual driving intake cam by the valve lift changing mechanism in the case where at least one or both of the temperature of the internal-combustion engine and the temperature of the atmosphere satisfies a predetermined cam switching inhibition condition for inhibiting the use of the second intake cam as the actual driving intake cam during the operation of the internal-combustion engine, whereas the intake cam switching control unit may control the valve lift changing mechanism to switch the actual driving intake cam according to a load on the internal-combustion engine in the case where the cam switching inhibition condition is not satisfied (a fourth aspect of the invention).

The fourth aspect of the invention makes it possible to prohibit using, as the actual driving intake cam, the second intake cam, which causes a relatively small effective compression ratio if used as the actual driving intake cam, according to one or both of the temperature of the internal-combustion engine and the temperature of the atmosphere while the internal-combustion engine is in operation. Further, the first intake cam, which permits a relatively large effective compression ratio, can be used as the actual driving intake cam.

For example, the cam switching inhibition condition is set such that it is satisfied if one or both of the temperature of the internal-combustion engine and the temperature of the atmosphere are relatively low (specifically, for example, if the temperature of the internal-combustion engine is a predetermined value or less, the temperature of the atmosphere is a predetermined value or less, or the value obtained by linearly combining both temperatures is a predetermined value or less). This allows the first intake cam to be used as the actual driving intake cam without using the second intake cam in the low-temperature environment. Thus, even in a situation wherein it is difficult for the temperature of the air charged into the combustion chamber of the internal-combustion engine to rise during the operation of the internal-combustion engine, sufficient compression of the air, i.e., a sufficient temperature rise of the air, can be accomplished. As a result, it becomes possible to prevent the occurrence of a misfire of the fuel in the combustion chamber of the internal-combustion engine.

Further, in the fourth aspect of the invention, preferably, in a case where a load on the internal-combustion engine corresponding to the specific state, in which the intake cam switching control unit switches the actual driving intake cam, is defined as a cam switching load in a state wherein the cam switching inhibition condition is not satisfied, the cam phase control unit controls the valve phase changing mechanism to maintain the phase angle of the first intake cam to be the first lag angle side valve opening start phase angle in the case where the load on the internal-combustion engine is lower than the cam switching load or the cam phase control unit controls the valve phase changing mechanism to change the phase angle of the first intake cam in a lead angle direction between the first lag angle side valve opening start phase angle and the first lead angle side valve opening start phase angle as the load on the internal-combustion engine increases in the case where the load on the internal-combustion engine is higher than the cam switching load in a state which satisfies the cam switching inhibition condition, and the controller further comprises a throttle control unit which controls the opening degree of a throttle valve provided in an intake passage of the internal-combustion engine to be smaller than that in the case where the cam switching inhibition condition is not satisfied in the case where the load on the internal-combustion engine is lower than the cam switching load in the state which satisfies the cam switching inhibition condition, and also control the opening degree of the throttle valve to the same opening degree as that in the case where the cam switching inhibition condition is not satisfied in the case where the load on the internal-combustion engine is higher than the cam switching load (a fifth aspect of the invention).

According to the fifth aspect of the invention, in the case where the cam switching inhibition condition is satisfied, the phase angle of the first intake cam serving as the actual driving intake cam and the opening degree of the throttle valve are controlled as described above. This makes it possible to operate the internal-combustion engine such that the output torque of the internal-combustion engine will be substantially the same in the case where the cam switching inhibition condition is satisfied and in the case where the cam switching inhibition condition is not satisfied.

In the first to the fifth aspects of the invention, the profiles of the first and the second intake cams are preferably set such that the effective compression ratio of the combustion chamber of the internal-combustion engine in the case where the intake valve is opened/closed by the first intake cam and that in the case where the intake valve is opened/closed by the second intake cam agree with each other in the specific state (a sixth aspect of the invention).

According to the sixth aspect of the invention, the effective compression ratio of the combustion chamber of the internal-combustion engine in the case where the intake valve is opened/closed by the first intake cam and that in the case where the intake valve is opened/closed by the second intake cam agree with each other in the specific state.

Thus, in the case where the switching of the actual driving intake cam is carried out in the specific state while the load on the internal-combustion engine is increasing or decreasing, it will be possible to prevent a discontinuous change in the amount of air charged into the combustion chamber of the internal-combustion engine from taking place before and after the switching. This allows the actual driving intake cam to be switched while restraining fluctuations in the output torque of the internal-combustion engine.

Another illustrative embodiment related to the controller for an internal-combustion engine in accordance with the present invention described above will now be described. To fulfill the object, there is provided a controller for an internal-combustion engine including: an intake valve driving mechanism that has a first intake cam and a second intake cam selectively used to open/close an intake valve, a valve lift changing mechanism that selectively switches an actual driving intake cam, which is an intake cam actually opening/closing the intake valve, to either the first intake cam or the second intake cam, and a valve phase changing mechanism that changes the phase angles of the first and the second intake cams relative to the phase angle of a crankshaft, the profiles of the first and the second intake cams being set such that, in the case where the intake valve is opened/closed by the first intake cam, the lift amount of the intake valve and the angle width of an open valve period are both larger than those in the case where the intake valve is opened/closed by the second intake cam, the profiles of the first and the second intake cams being set such that the angle width in the open valve period of the intake valve driven by the first intake cam becomes an angle width that is larger than an angle width between a top dead center and a bottom dead center and the angle width in the open valve period of the intake valve driven by the second intake cam becomes an angle width that is closer to the angle width between the top dead center and the bottom dead center than the angle width in the open valve period of the intake valve driven by the first intake cam, an intake cam switching control unit, which defines the first intake cam out of the first and the second intake cams as the intake cam for a low load operation of the internal-combustion engine and defines the second intake cam as the intake cam for a high load operation of the internal-combustion engine, controls the valve lift changing mechanism to switch the actual driving intake cam according to the load on the internal-combustion engine while the internal-combustion engine is in operation, and holds the second intake cam as the actual driving intake cam by the valve lift changing mechanism at the time of starting up the internal-combustion engine; and a cam phase control unit, which controls the valve phase changing mechanism to change the phase angle of the actual driving intake cam according to the load on the internal-combustion engine while the internal-combustion engine is in operation, and controls the valve phase changing mechanism to change the phase angle of the actual driving intake cam in a predetermined pattern according to at least one of the temperature of the internal-combustion engine, the temperature of the atmosphere, and the pressure of the atmosphere at the time of starting up the internal-combustion engine, wherein the cam phase control unit controls the valve lift changing mechanism such that, at the time of opening/closing the intake valve by the first intake cam, the phase angle at the start of the opening of the intake valve changes in a lead angle direction within a range between a predetermined lead angle side valve opening start phase angle that is on the lead angle side relative to the top dead center and a predetermined first lag angle side valve opening start phase angle on a lag angle side relative to the lead angle side valve opening start phase angle as the load on the internal-combustion engine increases, and also controls the valve lift changing mechanism such that, at the time of opening/closing the intake valve by the second intake cam, the phase angle at the start of the opening of the intake valve changes in a lag angle direction within a range between the lead angle side valve opening start phase angle and a predetermined second lag angle side valve opening start phase angle that is on a lag angle side relative to the lead angle side valve opening phase angle as the load on the internal-combustion engine increases while the internal-combustion engine is in operation, the intake cam switching control unit switches the actual driving intake cam in a specific state, in which the phase angle of the first intake cam and the phase angle of the second intake cam are controlled such that a phase angle at a start of opening of the intake valve by the first intake cam and a phase angle at a start of opening of the intake valve by the second intake cam agree with each other at the lead angle side valve opening start phase angle, while the internal-combustion engine is in operation, the lead angle side valve opening start phase angle and the first lag angle side valve opening start phase angle are set beforehand such that the amount of air charged in a combustion chamber of the internal-combustion engine during the open valve period of the intake valve in the case where the intake valve is opened/closed by the first intake cam increases as the phase angle at the opening start of the intake valve changes in the lead angle direction within the range between the lead angle side valve opening start phase angle and the first lag angle side valve opening start phase angle, and the lead angle side valve opening start phase angle and the second lag angle side valve opening start phase angle are set beforehand such that the amount of air charged in a combustion chamber of the internal-combustion engine during the open valve period of the intake valve in the case where the intake valve is opened/closed by the second intake cam increases as the phase angle at the opening start of the intake valve changes in the lag angle direction within the range between the lead angle side valve opening start phase angle and the second lag angle side valve opening start phase angle (a seventh aspect of the invention).

According to the seventh aspect of the invention, while the internal-combustion engine is in operation, when the intake valve is opened/closed by the first intake cam serving as the intake cam for the low load operation of the internal-combustion engine, the valve phase changing mechanism is controlled such that the phase angle at the start of the opening of the intake valve by the first intake cam changes in the lead angle direction within the range between the lead angle side valve opening start phase angle and the first lag angle side valve opening start phase angle as the load on the internal-combustion engine increases.

In this case, the angle width in the open valve period of the intake valve driven by the first intake cam is larger than an angle width between the top dead center and the bottom dead center, namely, 180 degrees, thus making it possible to set the phase angle at the opening end of the intake valve to be a phase angle on the lag angle side relative to the bottom dead center. This permits the Atkinson-cycle (Miller-cycle) operation of the internal-combustion engine, in which the effective compression ratio is smaller than an expansion ratio when the intake valve is opened/closed by the first intake cam.

Further, the lead angle side valve opening start phase angle and the first lag angle side valve opening start phase angle are to be properly set beforehand. This makes it possible to increase the effective compression ratio of the combustion chamber of the internal-combustion engine while moving the phase angle at the opening end of the intake valve from the lag angle side toward a phase angle at the bottom dead center as the phase angle at the start of the opening of the intake valve by the first intake cam is changed in the lead angle direction from the first lag angle side valve opening start phase angle to the lead angle side valve opening start phase angle (to consequently change the whole open valve period of the intake valve in the lead angle direction). As a result, the amount of air charged into the combustion chamber of the internal-combustion engine can be increased in the open valve period of the intake valve as the load on the internal-combustion engine increases while the internal-combustion engine is in operation.

Further, while the internal-combustion engine is in operation, the valve phase changing mechanism is controlled such that, at the time of opening/closing the intake valve by the second intake cam serving as the intake cam for the high load operation of the internal-combustion engine, the phase angle at the start of the opening of the intake valve by the second intake cam is changed in the lag angle direction within a range between the lead angle side valve opening start phase angle and the second lag angle side valve opening start phase angle as the load on the internal-combustion engine increases.

In this case, the angle width in the open valve period of the intake valve driven by the second intake cam is smaller than the angle width in the open valve period of the intake valve driven by the first intake cam, thus making it possible to set the phase angle at the valve opening end of the intake valve to be a phase angle on the lead angle side relative to the bottom dead center. This permits the Atkinson-cycle (Miller-cycle) operation of the internal-combustion engine, in which the effective compression ratio is smaller than an expansion ratio when the intake valve is opened/closed by the second intake cam.

Further, the lead angle side valve opening start phase angle and the second lag angle side valve opening start phase angle are to be properly set beforehand. This makes it possible to increase the effective compression ratio of the combustion chamber of the internal-combustion engine while moving the phase angle at the opening end of the intake valve from the lead angle side toward the phase angle at the bottom dead center as the phase angle at the start of the opening of the intake valve by the second intake cam is changed in the lag angle direction from the lead angle side valve opening start phase angle to the second lag angle side valve opening start phase angle (to consequently change the whole open valve period of the intake valve in the lag angle direction). As a result, the amount of air charged into the combustion chamber of the internal-combustion engine during the open valve period of the intake valve can be increased as the load on the internal-combustion engine increases while the internal-combustion engine is in operation.

Further, according to the seventh aspect of the invention, the intake cam switching control unit switches the actual driving intake cam in the aforesaid specific state while the internal-combustion engine is in operation. The phase angle at the start of the opening of the intake valve by the first intake cam in the specific state is an utmost phase angle on the lead angle side in the range between the lead angle side valve opening start phase angle and the first lag angle side valve opening start phase angle (i.e., the lead angle side valve opening start phase angle). The phase angle at the start of the opening of the intake valve by the second intake cam in the specific state is an utmost phase angle on the lead angle side in the range between the lead angle side valve opening start phase angle and the second lag angle side valve opening start phase angle (i.e., the lead angle side valve opening start phase angle).

Therefore, the actual driving intake cam can be promptly switched without causing a sudden change in the phase angle of each intake cam in the specific state while the load on the internal-combustion engine is increasing or decreasing.

Further, the phase angle at the start of the opening of the intake valve when the actual driving intake cam is switched, namely, the lead angle side valve opening start phase angle, does not change before and after the switching of the actual driving intake cam. This obviates a sudden change in the amount of an exhaust gas (an exhaust gas recirculated by an EGR apparatus or an exhaust gas discharged from the combustion chamber during an exhaust stroke immediately preceding an intake stroke) charged together with air into the combustion chamber during the open valve period of the intake valve before and after the actual driving intake cam is switched. Consequently, the occurrence of a misfire is restrained.

According to the seventh aspect of the present invention, the intake cam switching control unit holds the second intake cam as the actual driving intake cam by the valve lift changing mechanism at the time of starting up the internal-combustion engine. In addition, the cam phase control unit controls the valve phase changing mechanism to change the phase angle of the second intake cam serving as the actual driving intake cam in a predetermined pattern according to at least one of the temperature of the internal-combustion engine, the temperature of the atmosphere and the pressure of the atmosphere at the time of starting up the internal-combustion engine.

In the seventh aspect of the invention, the comparison between the case where the first intake cam is used as the actual driving intake cam at the startup of the internal-combustion engine and the case where the second intake cam is used as the actual driving intake cam at the startup of the internal-combustion engine reveals that the effective compression ratio of the combustion chamber of the internal-combustion engine in the former case is smaller than that in the latter case.

Hence, if the internal-combustion engine were started up by using the first intake cam as the actual driving intake cam in an environment wherein the temperature of the internal-combustion engine or the temperature of the atmosphere is relatively low, or in an environment wherein the atmospheric pressure is relatively low (e.g. a place at a high altitude), then there would likely be a situation in which the temperature will not rise to a sufficiently high level in a condition where the air charged into the combustion chamber with the intake valve opened, the air being compressed. This tends to lead to a combustion failure of a fuel mixed in the air, such as a misfire.

According to the seventh aspect of the invention, therefore, the second intake cam is held to be the actual driving intake cam by the valve lift changing mechanism when starting up the internal-combustion engine, as described above. In this case, the ignition performance of the fuel in the combustion chamber of the internal-combustion engine tends to be subjected especially to the influence of the temperature of the internal-combustion engine, the temperature of the atmosphere, or the pressure of the atmosphere. Therefore, the phase angle of the second intake cam serving as the actual driving intake cam is changed in a predetermined pattern according to at least one of the temperature of the internal-combustion engine, the temperature of the atmosphere, and the pressure of the atmosphere.

With this arrangement, the seventh aspect of the invention makes it possible to successfully start burning of the fuel in the combustion chamber at the time of the startup of the internal-combustion engine under a variety of environmental conditions related to the temperature of the internal-combustion engine, the temperature of the atmosphere, or the pressure of the atmosphere, as with the case of the first aspect of the invention. As a result, a smooth startup of the internal-combustion engine can be accomplished.

According to the seventh aspect of the invention, therefore, the switching between the intake cams can be carried out while restraining the occurrence of a misfire or the like during the operation of the internal-combustion engine, and the internal-combustion engine can be properly started up under a variety of environmental conditions.

In the seventh aspect of the invention, the first lag angle side valve opening start phase angle and the second lag angle side valve opening start phase angle may of course be different from each other or may be the same.

In the seventh aspect of the invention, preferably, the cam phase control unit is capable of controlling the valve phase changing mechanism to change the phase angle of the actual driving intake cam according to at least one of the temperature of the internal-combustion engine and the temperature of the atmosphere at the time of starting up the internal-combustion engine, and also controls the valve phase changing mechanism according to at least one of the temperature of the internal-combustion engine and the temperature of the atmosphere such that the effective compression ratio of the combustion chamber defined by the phase angle of the actual driving intake cam is larger in the case where the temperature of the internal-combustion engine or the temperature of the atmosphere at the startup of the internal-combustion engine is relatively low than in the case where the temperature of the internal-combustion engine or the temperature of the atmosphere at the startup of the internal-combustion engine is relatively high (an eighth aspect of the invention).

According to the eighth aspect of the invention, if the temperature of the internal-combustion engine or the temperature of the atmosphere is on a low temperature side at the time of starting up the internal-combustion engine, then the phase angle of the actual driving intake cam is controlled through the intermediary of the valve phase changing mechanism such that the effective compression ratio of the combustion chamber defined by the phase angle of the actual driving intake cam (the second intake cam) becomes relatively large. Hence, the temperature of the air charged into the combustion chamber of the internal-combustion engine easily rises due to the compression at the time of starting up the internal-combustion engine, as with the case of the second aspect of the invention. This makes it possible to start up the internal-combustion engine while preventing the occurrence of a misfire of the fuel mixed in the air.

Further, if the temperature of the internal-combustion engine or the temperature of the atmosphere is on a high temperature side at the time of starting up the internal-combustion engine, then the phase angle of the actual driving intake cam is controlled through the intermediary of the valve phase changing mechanism such that the effective compression ratio of the combustion chamber defined by the phase angle of the actual driving intake cam (the second intake cam) becomes relatively small. This prevents the temperature of the air charged into the combustion chamber of the internal-combustion engine from excessively rising due to the compression, as with the second aspect of the invention. As a result, the internal-combustion engine can be started up while preventing the occurrence of knocking caused by abnormal combustion of a fuel mixed in the air.

In the seventh aspect and the eighth aspect of the invention, preferably, the cam phase control unit is capable of controlling the valve phase changing mechanism to change the phase angle of the actual driving intake cam according to the pressure of the atmosphere at the time of starting up the internal-combustion engine, and also controls the valve phase changing mechanism according to the pressure of the atmosphere such that the effective compression ratio of the combustion chamber defined by the phase angle of the actual driving intake cam is larger in the case where the pressure of the atmosphere at the startup of the internal-combustion engine is relatively low than in the case where the pressure of the atmosphere at the startup of the internal-combustion engine is relatively high (a ninth aspect of the invention).

According to the ninth aspect of the invention, if the pressure of the atmosphere is on a low pressure side at the time of starting up the internal-combustion engine (e.g., in a place at a high altitude), then the phase angle of the actual driving intake cam is controlled through the intermediary of the valve phase changing mechanism such that the effective compression ratio of the combustion chamber defined by the phase angle of the actual driving intake cam (the second intake cam) becomes relatively large. Hence, the temperature of the air charged into the combustion chamber of the internal-combustion engine easily rises due to the compression even in an environment where the pressure of the atmosphere is relatively low, as with the case of the third aspect of the invention. This makes it possible to start up the internal-combustion engine while preventing the occurrence of a misfire of the fuel mixed in the air.

Further, if the pressure of the atmosphere at the time of starting up the internal-combustion engine is not on the low pressure side (e.g., in a standard atmospheric pressure environment), then the phase angle of the actual driving intake cam is controlled through the intermediary of the valve phase changing mechanism such that the effective compression ratio of the combustion chamber defined by the phase angle of the actual driving intake cam (the second intake cam) becomes relatively small. This prevents the temperature of the air charged into the combustion chamber of the internal-combustion engine from excessively rising due to the compression, as with the third aspect of the invention. As a result, the internal-combustion engine can be started up while preventing the occurrence of knocking caused by abnormal combustion of a fuel mixed in the air.

Further, in the seventh to the ninth aspects of the invention, the switching of the actual driving intake cam may be restricted, as necessary, also while the internal-combustion engine is in operation.

More specifically, the intake cam switching control unit may control the valve lift changing mechanism to hold the second intake cam as the actual driving intake cam by the valve lift changing mechanism in the case where at least one or both of the temperature of the internal-combustion engine and the temperature of the atmosphere satisfies a predetermined cam switching inhibition condition for prohibiting the use of the first intake cam as the actual driving intake cam during the operation of the internal-combustion engine, whereas the intake cam switching control unit may control the valve lift changing mechanism to switch the actual driving intake cam according to a load on the internal-combustion engine in the case where the cam switching inhibition condition is not satisfied (a tenth aspect of the invention).

The tenth aspect of the invention makes it possible to prohibit using, as the actual driving intake cam, the first intake cam, which causes a relatively small effective compression ratio if used as the actual driving intake cam, according to one or both of the temperature of the internal-combustion engine and the temperature of the atmosphere while the internal-combustion engine is in operation. Further, the second intake cam, which permits a relatively large effective compression ratio, can be used as the actual driving intake cam.

For example, the cam switching inhibition condition is set such that it is satisfied if one or both of the temperature of the internal-combustion engine and the temperature of the atmosphere are relatively low (specifically, for example, if the temperature of the internal-combustion engine is a predetermined value or less, the temperature of the atmosphere is a predetermined value or less, or the value obtained by linearly combining both temperatures is a predetermined value or less). This allows the second intake cam to be used as the actual driving intake cam without using the first intake cam in the low-temperature environment. Thus, even in a situation wherein it is difficult for the temperature of the air charged into the combustion chamber of the internal-combustion engine to rise during the operation of the internal-combustion engine, sufficient compression of the air, i.e., a sufficient temperature rise of the air, can be accomplished, as with the case of the fourth aspect of the invention. As a result, it becomes possible to prevent the occurrence of a misfire of the fuel in the combustion chamber of the internal-combustion engine.

Further, in the tenth aspect of the invention, preferably, in the case where a load on the internal-combustion engine corresponding to the specific state, in which the intake cam switching control unit switches the actual driving intake cam, is defined as a cam switching load in a state wherein the cam switching inhibition condition is not satisfied, the cam phase control unit controls the valve phase changing mechanism to maintain the phase angle of the second intake cam to be the lead angle side valve opening start phase angle in the case where the load on the internal-combustion engine is lower than the cam switching load or the cam phase control unit controls the valve phase changing mechanism to change the phase angle of the second intake cam in a lag angle direction between the lead angle side valve opening start phase angle and a second lag angle side valve opening start phase angle as the load on the internal-combustion engine increases in the case where the load on the internal-combustion engine is higher than the cam switching load in a state which satisfies the cam switching inhibition condition, and the cam phase control unit further comprises a throttle control unit which controls the opening degree of a throttle valve provided in an intake passage of the internal-combustion engine to be smaller than that in the case where the cam switching inhibition condition is not satisfied in the case where the load on the internal-combustion engine is lower than the cam switching load in the state which satisfies the cam switching inhibition condition, and also control the opening degree of the throttle valve to the same opening degree as that in the case where the cam switching inhibition condition is not satisfied in the case where the load on the internal-combustion engine is higher than the cam switching load (an eleventh aspect of the invention).

According to the eleventh aspect of the invention, in the case where the cam switching inhibition condition is satisfied, the phase angle of the second intake cam serving as the actual driving intake cam and the opening degree of the throttle valve are controlled as described above. This makes it possible to operate the internal-combustion engine such that the output torque of the internal-combustion engine will be substantially the same in the case where the cam switching inhibition condition is satisfied and in the case where the cam switching inhibition condition is not satisfied.

In the seventh to the eleventh aspects of the invention, the profiles of the first and the second intake cams are preferably set such that the effective compression ratio of the combustion chamber of the internal-combustion engine in the case where the intake valve is opened/closed by the first intake cam and that in the case where the intake valve is opened/closed by the second intake cam agree with each other in the specific state (a twelfth aspect of the invention).

According to the twelfth aspect of the invention, the effective compression ratio of the combustion chamber of the internal-combustion engine in the case where the intake valve is opened/closed by the first intake cam and that in the case where the intake valve is opened/closed by the second intake cam agree with each other in the specific state.

Thus, as with the case of the sixth aspect of the invention, in the case where the switching of the actual driving intake cam is carried out in the specific state while the load on the internal-combustion engine is increasing or decreasing, it will be possible to prevent a discontinuous change in the amount of air charged into the combustion chamber of the internal-combustion engine from taking place before and after the switching. This allows the actual driving intake cam to be switched while restraining fluctuations in the output torque of the internal-combustion engine.

DESCRIPTION OF THE PREFERRED EMBODIMENTS

First Embodiment

Figure 1:
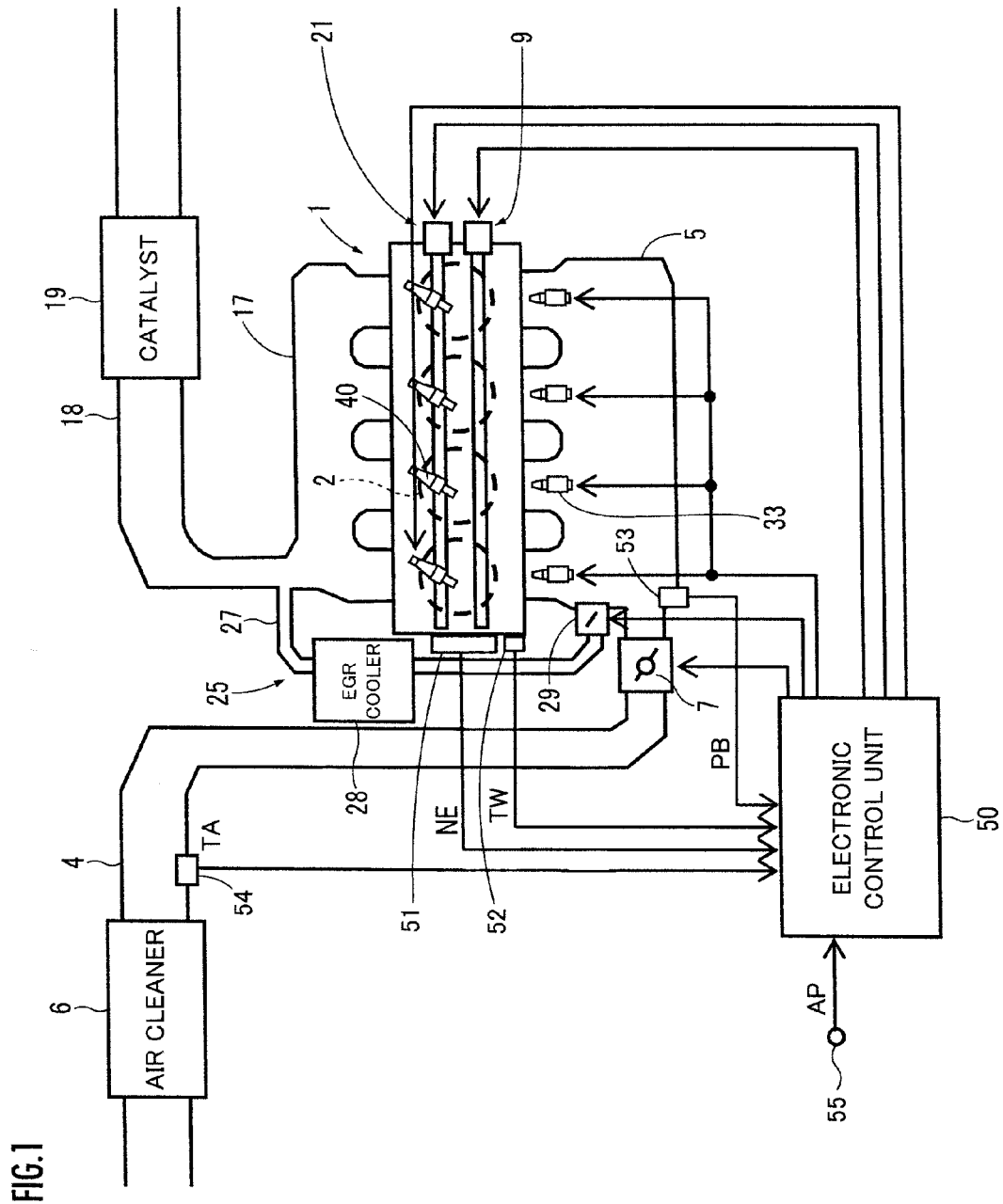
FIG. 1 is a diagram illustrating the configuration of an internal-combustion engine and a system attached thereto in an embodiment (a first embodiment) of the present invention.
Figure 2:
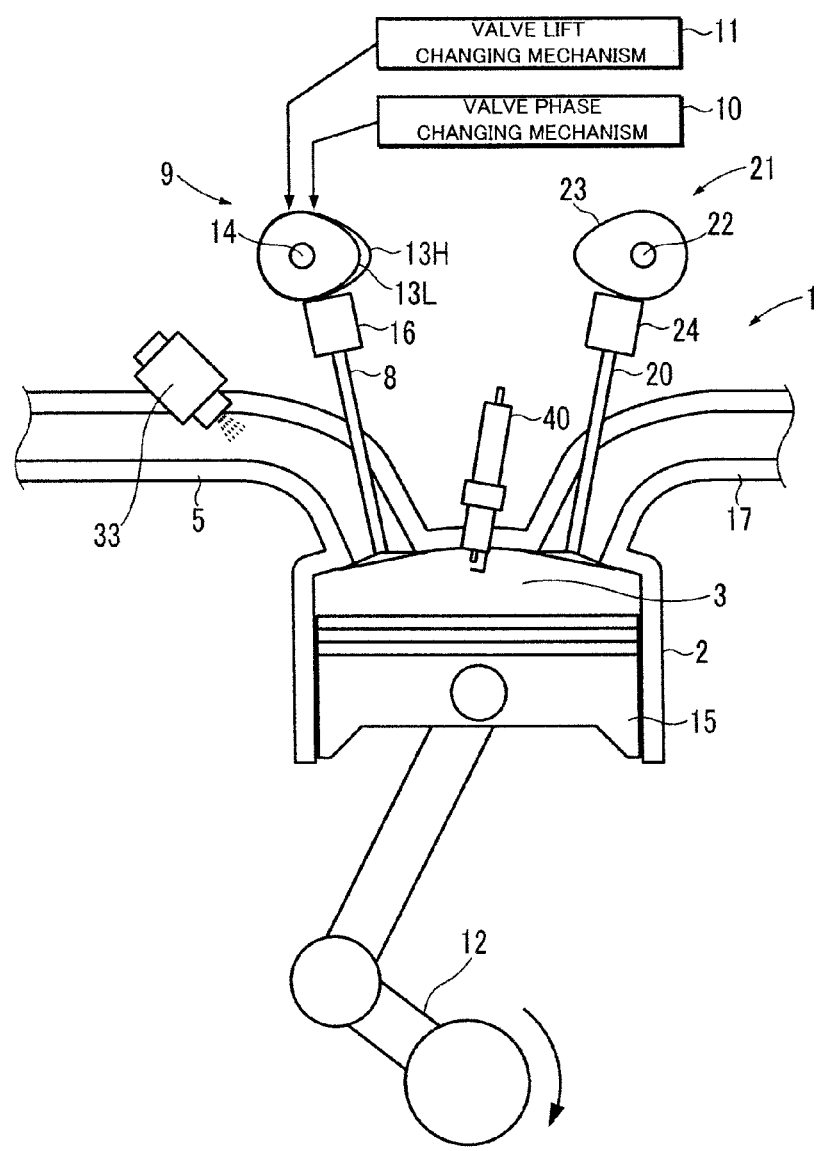
FIG. 2 is a schematic diagram illustrating the configuration related to an intake valve and an exhaust valve of the internal-combustion engine of the first embodiment.

An embodiment as a first embodiment of the present invention will be described below. Referring to FIG. 1 and FIG. 2, a system of the present embodiment has an internal-combustion engine 1 mounted as a motive power source for a vehicle to travel and an electronic control unit 50 which controls the operation of the internal-combustion engine 1.

The internal-combustion engine 1 in the present embodiment is, for example, a four-cylinder internal-combustion engine. However, the number of the cylinders of the internal-combustion engine 1 does not have to be four. The internal-combustion engine 1 may alternatively be, for example, a single-cylinder or a six-cylinder internal-combustion engine.

An intake system of the internal-combustion engine 1 is constructed to supply air (fresh air) to be mixed with a fuel burned in a combustion chamber 3 of each of cylinders 2 into the combustion chamber 3 of each of the cylinders 2 through the intermediary of an intake passage 4 shared by all cylinders 2 and an intake manifold 5, which is in communication with an intake port of the combustion chamber 3 of each of the cylinders 2 in this order.

In this case, the intake passage 4 is provided with an air cleaner 6, which removes undesired substances from the air (atmosphere) coming in from outside, and a throttle valve 7, which adjusts the flow of the air, the air cleaner 6 and the throttle valve 7 being installed in this order from the upstream side. The throttle valve 7 is an electrically-operated throttle valve and the opening degree thereof is controlled through the intermediary of an electric motor (not shown).

The internal-combustion engine 1 is provided with an intake valve 8 for opening/closing the intake port of the combustion chamber 3 of each of the cylinders 2 and an intake valve driving mechanism 9 which opens/closes the intake valve 8.

According to the present embodiment, in order to implement the Atkinson-cycle (Miller-cycle) operation of the internal-combustion engine 1, which makes it possible to variably control the effective compression ratio of the combustion chamber 3 of each of the cylinders 2 of the internal-combustion engine 1, the intake valve driving mechanism 9 has a publicly known valve phase changing mechanism 10 (a mechanism so-called VTC) which changes the phase angle of the open valve period of the intake valve 8 and a publicly known valve lift changing mechanism 11 (a mechanism so-called VTEC (registered trademark)) which changes the lift amount (maxim opening degree) of the intake valve 8 and the angle width in the open valve period.

The angle width in the open valve period of the intake valve 8 is the open valve period from the start of the opening to the end of the opening of the intake valve 8, which is expressed in terms of the rotational angle width of the crankshaft 12, which is the output shaft of the internal-combustion engine 1. In other words, the angle width in the open valve period of the intake valve 8 is the angle difference between the phase angle (the rotational angle position) of the crankshaft 12 at the start of the opening of the intake valve 8 and the phase angle of the crankshaft 12 at the end of opening of the intake valve 8. Further, the phase angle of the open valve period of the intake valve 8 means a phase angle that representatively indicates the range of phase angle of the crankshaft 12 in which the entire open valve period lies. The phase angle of the open valve period of the intake valve 8 is expressed by, for example, the phase angle at the start of the opening of the intake valve 8 (the phase angle of the crankshaft 12 at the start of valve opening) or the phase angle at the end of opening of the intake valve 8 (the phase angle of the crankshaft 12 at the end of valve opening).

The construction of the intake valve driving mechanism 9 will be schematically described, a detailed illustration thereof being omitted. Referring to FIG. 2, the intake valve driving mechanism 9 has the valve phase changing mechanism 10, the valve lift changing mechanism 11, and two intake cams 13L and 13H for each of the cylinders 2. The intake cams 13L and 13H are rotatably supported by a cam shaft 14 on the intake side such that they rotate together with the cam shaft 14 as one piece.

The profiles (shape patterns) of the intake cams 13L and 13H are set such that the pairs of the lift amount of the intake valve 8 and the angle width in the open valve period are different from each other.

The profiles of the intake cams 13L and 13H are set such that the lift amount and the angle width in the open valve period of the intake valve 8 by the intake cam 13H are larger than the lift amount and the angle width in the open valve period of the intake valve 8 by the intake cam 13L, as indicated by solid lines a and d in FIG. 3 (hereinafter, the intake cam 13H will be referred to as the large lift intake cam 13H, while the intake cam 13L will be referred to as the small lift intake cam 13L in some cases). The crank angle on the axis of abscissas in FIG. 3 means the phase angle of the crankshaft 12.

In this case, the angle width in the open valve period of the intake valve 8 by the large lift intake cam 13H is set to an angle width that is closer to the angle difference between the phase angle at the top dead center and the phase angle at the bottom dead center of a piston 15 of each of the cylinders 2 (=180 degrees) than the angle width in the open valve period of the intake valve 8 by the small lift intake cam 13L. More specifically, the angle width in the open valve period of the intake valve 8 by the large lift intake cam 13H is set to, for example, an angle width (e.g., approximately 190 degrees), which is slightly larger than the angle difference between the phase angle at the top dead center and the phase angle at the bottom dead center (=180 degrees).

The angle width in the open valve period of the intake valve 8 by the small lift intake cam 13L is set to be smaller than the angle difference between the phase angle at the top dead center and the phase angle at the bottom dead center (=180 degrees), e.g., approximately 100 degrees.

The intake valve driving mechanism 9 is constructed such that an intake cam that actually drives the intake valve 8 through the intermediary of a rocker arm 16 (hereinafter referred to as the actual driving intake cam) is selectively switched to either the small lift intake cam 13L or the large lift intake cam 13H by the hydraulic valve lift changing mechanism 11. In this case, the small lift intake cam 13L is used as the intake cam for a low load operation of the internal-combustion engine 1. The large lift intake cam 13H is used as the intake cam for a high load operation of the internal-combustion engine 1.

The valve lift changing mechanism 11 has a publicly known construction, such as the same construction disclosed in, for example, FIG. 2 of Japanese Patent Application Laid-Open No. 2005-180306. However, the valve lift changing mechanism 11 may have a different construction as long as it has a mechanism that allows the actual driving intake cam to be selectively switched to either the small lift intake cam 13L or the large lift intake cam 13H. Further, the valve lift changing mechanism 11 may be an electric type rather than being limited only to a hydraulic type.

The intake-side cam shaft 14, which rotatably supports the intake cams 13L and 13H, is rotationally supported by an oil chamber forming member (not shown) connected to the crankshaft 12 through the intermediary of a timing belt (not shown) such that the cam shaft 14 rotates as the crankshaft 12 of the internal-combustion engine 1 rotates (the cam shaft 14 rotating once each time the crankshaft 12 rotates twice). The intake-side cam shaft 14 is adapted such that its phase angle (angular position) relative to the oil chamber forming member in the direction of rotation thereof can be changed within a predetermined angle range.

With this arrangement, the phase angle of the intake-side cam shaft 14, i.e., the phase angles of the small lift intake cam 13L and the large lift intake cam 13H, relative to the phase angle of the crankshaft 12, can be continuously changed within a predetermined angle range.

The intake valve driving mechanism 9 is constructed to change the phase angle of the intake-side cam shaft 14 relative to the phase angle of the crankshaft 12, i.e., the phase angles of the small lift intake cam 13L and the large lift intake cam 13H relative to the phase angle of the crankshaft 12, by the hydraulic valve phase changing mechanism 10. This arrangement makes it possible to continuously change the phase angle of the open valve period of the intake valve 8 in a predetermined range by the small lift intake cam 13L and the large lift intake cam 13H, respectively, as illustrated in FIG. 3.

Figure 3:
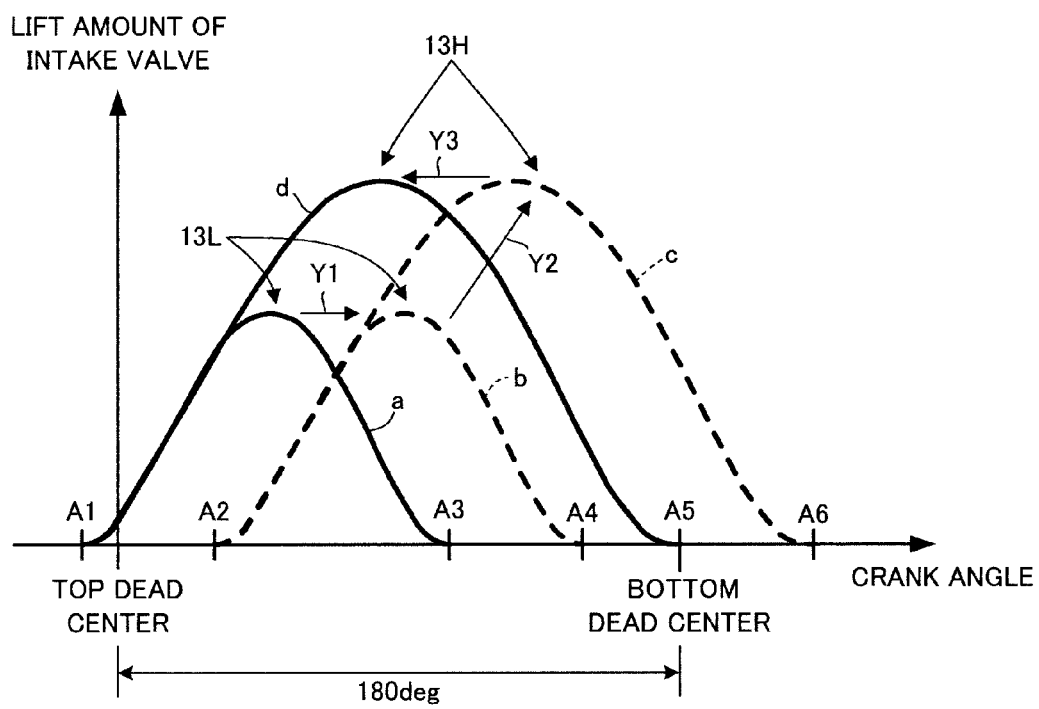
FIG. 3 is a graph illustrating the driving characteristics of the intake valve of the internal-combustion engine of the first embodiment.

The valve phase changing mechanism 10 has a publicly known construction, such as the same construction disclosed in, for example, FIG. 3 of Japanese Patent Application Laid-Open No. 2005-180306. However, the valve phase changing mechanism 10 may have a different construction as long as it has a mechanism capable of continuously changing the phase angles of the small lift intake cam 13L and the large lift intake cam 13H relative to the phase angle of the crankshaft 12 within the predetermined range. Further, the valve phase changing mechanism 10 may be an electric type rather than being limited only to a hydraulic type.

The profiles of the intake cams 13L and 13H, the changes in the phase angles of the intake cams 13L and 13H, and the open valve patterns of the intake valve 8 implemented by switching between the intake cams 13L and 13H will now be described in further detail.

In the present embodiment, the intake cams 13L and 13H rotate integrally with the intake-side cam shaft 14. Hence, a constant mutual phase relationship between the intake cams 13L and 13H is maintained. This means that a constant mutual phase relationship in the open valve period of the intake valve 8 by each of the intake cams 13L and 13H is also maintained.

In the example of the present embodiment, the mutual phase relationship between the intake cams 13L and 13H is set such that the phase angle at the start of the opening of the intake valve 8 by the intake cam 13L and the phase angle at the start of the opening of the intake valve 8 by the intake cam 13H will be the same, as illustrated in FIG. 3. Alternatively, however, the phase angle at the start of the opening of the intake valve 8 by the intake cam 13L and that by the intake cam 13H may be set to be different to a certain degree.

In the present embodiment, the phase angles of the intake cams 13L and 13H, i.e., the phase angles in the open valve period of the intake valve 8 by the intake cams 13L and 13H, change within the ranges of the states defined by solid lines a and d in FIG. 3 and the states defined by dashed lines b and c in FIG. 3.

The states indicated by solid lines a and d in FIG. 3 are the states in which the phase angles of the intake cams 13L and 13H have been controlled to a maximum lead angle end. In the example of the present embodiment, the phase angle at the start of the opening of the intake valve 8 in the states is set to a predetermined phase angle A1 at which the magnitude of the difference thereof from the phase angle at the top dead center is sufficiently small, namely, a phase angle that coincides or substantially coincides with the phase angle at the top dead center. The phase angle A1 is, for example, an angle that is approximately 10 degrees toward the lead angle side from the phase angle at the top dead center.

Further, the angle width in the open valve period of the intake valve 8 by each of the intake cams 13L and 13H and the phase angle A1 at the start of the opening of the intake valve 8 in the states defined by the solid lines a and d in FIG. 3 are set as described above. Therefore, a phase angle A3 at the end of opening of the intake valve 8 in the state indicated by the solid line a in FIG. 3 related to the small lift intake cam 13L will be set to a phase angle on the lead angle side relative to the phase angle at the bottom dead center (a phase angle on the lead angle side by approximately 90 degrees from the phase angle at the bottom dead center in the present embodiment).

Further, in the state indicated by the solid line d in FIG. 3 related to the large lift intake cam 13H, the phase angle at the end of opening of the intake valve 8 will be set to a phase angle A5 at which the magnitude of the difference thereof from the phase angle at the bottom dead center is sufficiently small, namely, a phase angle that coincides or substantially coincides with the phase angle at the bottom dead center. The phase angle A5 in the example of the present embodiment is the same as the phase angle at the bottom dead center.

The states indicated by the dashed lines b and c in FIG. 3 are the states in which the phase angles of the intake cams 13L and 13H have been controlled to the maximum lag angle side. For both the intake cams 13L and 13H, the phase angle at the start of the opening of the intake valve 8 in the aforesaid states is set to a predetermined phase angle A2, which is on the lag angle side relative to the phase angle at the top dead center and which is on the lead angle side relative to the phase angle at the bottom dead center.

According to the present embodiment, the phase angle A2 is set to the phase angle lagged by, for example, approximately 60 degrees from the phase angle A1 at the start of the opening of the intake valve 8 in the states indicated by the solid lines a and d in FIG. 3, namely, the phase angle lagged by approximately 50 degrees from the top dead center.

Thus, in the state indicated by the dashed line c in FIG. 3 related to the large lift intake cam 13H, a phase angle A6 at the end of opening of the intake valve 8 is a phase angle on the lag angle side relative to the phase angle at the bottom dead center. In the state indicated by the dashed line b in FIG. 3 related to the small lift intake cam 13L, a phase angle A4 at the end of opening of the intake valve 8 is a phase angle on the lead angle side relative to the bottom dead center.

According to the present embodiment, the profiles of the intake cams 13L and 13H, the phase angles A1 and A2 at the start of the opening of the intake valve 8, and the phase angles A3, A4, A5 and A6 at the end of opening of the intake valve 8 are set as described above. This arrangement makes it possible to variably set the effective compression ratio of the combustion chamber 3 of each of the cylinders 2 by switching the actual driving intake cam to 13L or 13H, which opens/closes the intake valve 8, by the valve lift changing mechanism 11 or by changing the phase angles of the intake cams 13L and 13H by the valve phase changing mechanism 10 thereby to change the valve opening pattern of the intake valve 8 as described above.

The effective compression ratio of the combustion chamber 3 is, to be more specific, the ratio of a total volume V_IVC of the combustion chamber 3 (air charge chamber) at the end of opening of the intake valve 8 of each of the cylinders 2 to a total volume V_TDC of the combustion chamber 3 (air charge chamber) at the top dead center of the piston 15 (=V_IVC/V_TDC).

Figure 4:
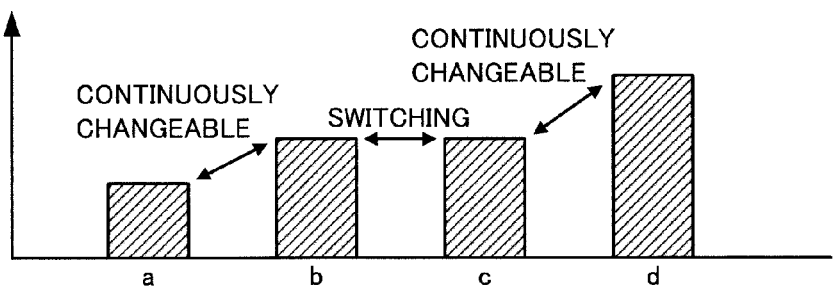
FIG. 4 is a diagram illustrating a phenomenon implemented by the driving characteristics of the intake valve shown in FIG. 3.

In the case where, for example, the intake valve 8 is opened/closed by the small lift intake cam 13L, the effective compression ratio of the combustion chamber 3 of each of the cylinders 2 can be continuously increased, as illustrated in FIG. 4, by continuously changing the phase angle of the small lift intake cam 13L from the phase angle in the state indicated by the solid line a in FIG. 3 (the utmost phase angle on the lead angle side) toward the phase angle in the state indicated by the dashed line b (the utmost phase angle on the lag angle side).

More specifically, according to the present embodiment, when the intake valve 8 is opened/closed by the small lift intake cam 13L, the phase angle at the end of opening of the intake valve 8 changes from a phase angle on the lead angle side relative to the phase angle at the bottom dead center to the phase angle at the bottom dead center as the phase angle of the small lift intake cam 13L is changed from the lead angle side to the lag angle side. Thus, the Atkinson-cycle (Miller-cycle) operation of the internal-combustion engine 1, in which the effective compression ratio becomes smaller than an expansion ratio, is achieved when the intake valve 8 is opened/closed by the small lift intake cam 13L. At the same time, as the phase angle of the small lift intake cam 13L is changed from the lead angle side to the lag angle side, the effective compression ratio of the combustion chamber 3 of each of the cylinders 2 increases.

Further, when the intake valve 8 is opened/closed by the large lift intake cam 13H, the effective compression ratio of the combustion chamber 3 of each of the cylinders 2 can be continuously increased, as illustrated in FIG. 4, by continuously changing the phase angle of the large lift intake cam 13H from the phase angle in the state indicated by the dashed line c in FIG. 3 (the utmost phase angle on the lag angle side) to the phase angle in the state indicated by the solid line d (the utmost phase angle on the lead angle side), as illustrated in FIG. 4.

More specifically, according to the present embodiment, when the intake valve 8 is opened/closed by the large lift intake cam 13H, the phase angle at the end of opening of the intake valve 8 changes from a phase angle on the lag angle side relative to the phase angle at the bottom dead center to the phase angle at the bottom dead center as the phase angle of the large lift intake cam 13H is changed from the lag angle side to the lead angle side. Thus, the Atkinson-cycle (Miller-cycle) operation of the internal-combustion engine 1, in which the effective compression ratio becomes smaller than an expansion ratio, is achieved also when the intake valve 8 is opened/closed by the large lift intake cam 13H. At the same time, as the phase angle of the large lift intake cam 13H is changed from the lag angle side to the lead angle side, the effective compression ratio of the combustion chamber 3 of each of the cylinders 2 increases.

According to the present embodiment, in the state indicated by the solid line d in FIG. 3, the opening start and the opening end of the intake valve 8 will have substantially the same phase angles as those at the top dead center and the bottom dead center, respectively. Thus, an Otto-cycle operation of the internal-combustion engine 1, in which the effective compression ratio is substantially the same as the expansion ratio, is implemented.

Supplementarily the amount of air to be charged into the combustion chamber 3 of each of the cylinders 2 during the open valve period of the intake valve 8 (more specifically, the amount of air in the case where conditions, such as the opening degree of the throttle valve 7 and the ambient temperature, other than the operating conditions of the intake valve 8 are retained to be constant) is substantially proportional to the effective compression ratio. Hence, the amount of air increases as the effective compression ratio increases.

Therefore, the amount of air to be charged into the combustion chamber 3 can be increased or decreased as the phase angle of the actual driving intake cam (the small lift intake cam 13L or the large lift intake cam 13H) is changed to increase or decrease the effective compression ratio of the combustion chamber 3 of each of the cylinders 2.

Further, according to the present embodiment, the profiles of the intake cams 13L and 13H are set such that the effective compression ratio of the combustion chamber 3 of each of the cylinders 2 will be the same or substantially the same in both the case where the small lift intake cam 13L is used as the actual driving intake cam and the case where the large lift intake cam 13H is used as the actual driving intake cam in a state wherein the phase angles of the intake cams 13L and 13H are controlled to be the utmost phase angles on the lag angle side, i.e., the state wherein the open valve periods of the intake valve 8 actuated by the intake cams 13L and 13H are the open valve periods indicated by the dashed lines b and c in FIG. 3.

Thus, by switching the actual driving intake cam from one of the intake cams 13L and 13H to the other in the state wherein the phase angles of the intake cams 13L and 13H have been controlled to the utmost phase angles on the lag angle side, which corresponds to the states indicated by the dashed lines b and c in FIG. 3, the effective compression ratio of the combustion chamber 3 of each of the cylinders 2 or the amount of air charged into the combustion chamber 3 can be maintained at a constant level or a substantially constant level at the time of switching the actual driving intake cam.

Referring back to the description related to FIG. 1, an exhaust system of the internal-combustion engine 1 is constructed to emit an exhaust gas, which is generated in the combustion chamber 3 of each of the cylinders 2, through an exhaust manifold 17, which is in communication with an exhaust port of the combustion chamber 3 of each of the cylinders 2, and an exhaust passage 18, which is shared by all the cylinders 2, in this order. In this case, the exhaust passage 18 is provided with a catalyst 19 for purifying the exhaust gas.

Further, an exhaust valve 20 for opening/closing the exhaust port of the combustion chamber 3 of each of the cylinders 2 and an exhaust valve driving mechanism 21, which opens/closes the exhaust valve 20, are attached to the internal-combustion engine 1.

The exhaust valve driving mechanism 21 has an exhaust cam 23 for each of the cylinders 2. The exhaust cam 23 is rotatably supported by a cam shaft 22 adjacent to the exhaust end such that the exhaust cam 23 rotates integrally with the cam shaft 22, which rotates as the crankshaft 12 of the internal-combustion engine 1 rotates, the cam shaft 22 rotating once as the crankshaft 12 rotates twice. The exhaust cam 23 opens/closes the exhaust valve 20 by the exhaust cam 23 through the intermediary of a rocker arm 24.

Figure 5:
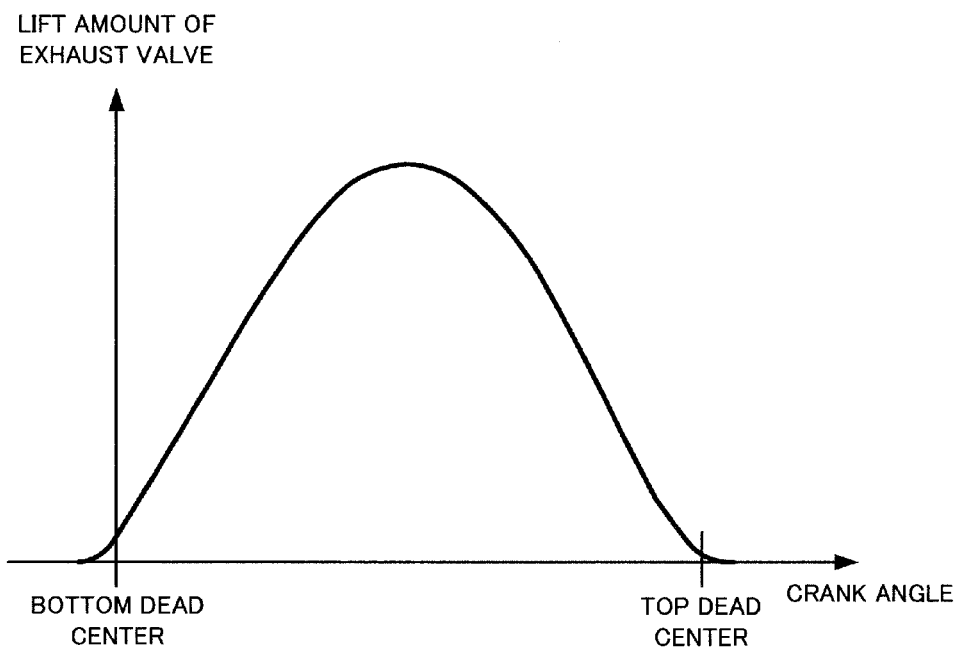
FIG. 5 is a graph illustrating the driving characteristics of the exhaust valve of the internal-combustion engine of the first embodiment.

In this case, the profile (shape pattern) of the exhaust cam 23 is set such that the open valve period and the lift amount of the exhaust valve 20 defined thereby take a pattern shown in, for example, FIG. 5. According to the pattern, the angle width in the open valve period of the exhaust valve 20 is set to be slightly larger than the angular difference between the phase angle at the bottom dead center and the phase angle at the top dead center of the piston 15 of each of the cylinders 2 (180 degrees). Further, the phase angle at the start of opening of the exhaust valve 20 is set to be slightly closer to the lead angle side than the phase angle at the bottom dead center, while the phase angle at the end of opening thereof is set to be slightly closer to the lag angle side than the phase angle at the top dead center.

The intake system and the exhaust system of the internal-combustion engine 1 constructed as described above are further provided with an EGR unit 25.

The EGR unit 25 recirculates a part of an exhaust gas to the intake side and supplies the recirculated exhaust gas together with air (fresh air to be mixed with a fuel) into the combustion chamber 3 of each of the cylinders 2. The EGR unit 25 has an EGR passage 27 (a passage of a recirculated exhaust gas), which is branched from an upstream end of the exhaust passage 18 (in the vicinity of the connection with the exhaust manifold 17) and merged with the intake manifold 5.

The EGR passage 27 is provided with an EGR cooler 28, which serves as an exhaust gas cooling means for cooling the exhaust gas to be recirculated to the intake side, and an electric or electromagnetic flow control valve 29 for controlling the flow of the exhaust gas (hereinafter referred to as the EGR valve 29). An EGR ratio (the ratio of the amount of an exhaust gas to the total amount of air supplied to the combustion chamber 3 and the exhaust gas) can be controlled by controlling the degree of opening of the EGR valve 29.

The internal-combustion engine 1 has a fuel injection valve 33 attached thereto, which is provided for each of the cylinders 2 as a constituent element of a fuel supply unit supplying a fuel to be burnt in the combustion chamber 3 in each of the cylinders 2. A fuel, such as gasoline, the pressure of which has been increased by a pump or the like, is supplied to the fuel injection valve 33 from a fuel tank (not shown).

The fuel injection valve 33 in the present embodiment is a port injection type and attached to the intake manifold 5, as illustrated in FIG. 2. The amount of a fuel to be injected (the amount of a fuel to be supplied into the combustion chamber 3) can be controlled by controlling the duration of opening of the fuel injection valve 33. The fuel injection valve 33 may alternatively be a direct injection type.

The internal-combustion engine 1 further has spark plugs 40 attached thereto, each of which is provided for each of the cylinders 2 as a constituent element of an ignition device that ignites an air-fuel mixture compressed in the combustion chamber 3 of each of the cylinders 2.

A spark plug 40 is mounted on the top of the combustion chamber 3 of each of the cylinders 2, as illustrated in FIG. 2, and implements a spark discharge when a high voltage is supplied thereto from a distributor (not shown) at a predetermined timing.

The above has described the mechanical construction of the system, namely, the internal-combustion engine 1 and the system attached thereto, according to the present embodiment.

The electronic control unit 50 is an electronic circuit unit, which includes a CPU, a RAM, a ROM and the like. The electronic control unit 50 controls the operations of the throttle valve 7, the valve phase changing mechanism 10 and the valve lift changing mechanism 11 of the intake valve driving mechanism 9, the EGR valve 29 of the EGR unit 25, the fuel injection valves 33, and the spark plugs 40.

The electronic control unit 50 carrying out the aforesaid control receives the detection signals from various sensors. The system according to the present embodiment has sensors described below. The detection signals of the sensors are input to the electronic control unit 50.

In the system according to the present embodiment, a rotational speed sensor 51, which outputs a signal for detecting the number of rotations NE (rotational speed) of the crankshaft 12 of the internal-combustion engine 1 (more specifically, a pulse signal generated for each predetermined rotational angle of the crankshaft 12), and an engine temperature sensor 52 which detects an engine temperature TW (more specifically, the temperature of cooling water) of the internal-combustion engine 1 are attached to the internal-combustion engine 1.

Further, the intake passage 4 is provided with an intake pressure sensor 53 that detects an intake pressure PB, which is the pressure of the air flowing into the combustion chamber 3 of each of the cylinders 2 of the internal-combustion engine 1, and an intake temperature sensor 54 that detects an intake temperature TA, which is the temperature of the air.

Further, the system according to the present embodiment has an acceleration sensor 55, which detects the amount of depression on a gas pedal (hereinafter referred to as the accelerator manipulated variable AP) of a vehicle, which is not shown.

In the present embodiment, the intake pressure PB detected by the intake pressure sensor 53 and the intake temperature TA detected by the intake temperature sensor 54 are used as the substitutes of the detection values of the atmospheric pressure and the ambient temperature at the time of starting up the internal-combustion engine 1. Hence, a sensor that directly detects the atmospheric pressure or the ambient temperature may be provided.

The operation of the system according to the present embodiment will now be described. First, the operation related to the startup of the internal-combustion engine 1 will be described with reference to FIG. 6 to FIG. 8.

Figure 6:
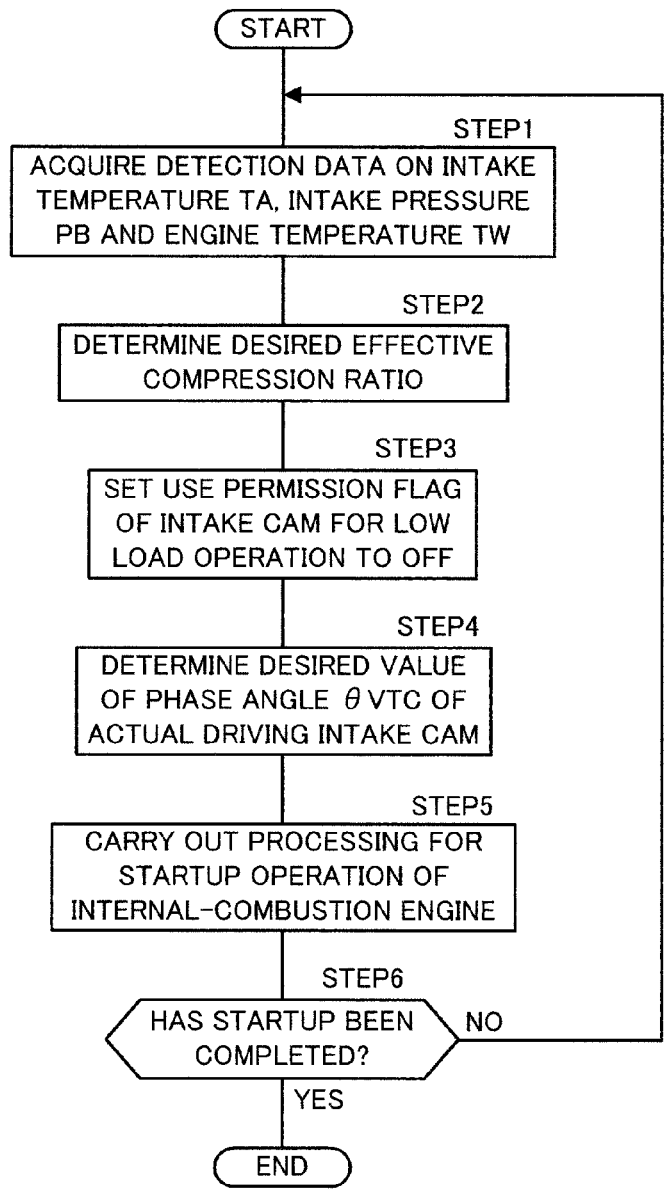
FIG. 6 is a flowchart illustrating the processing carried out by an electronic control unit shown in FIG. 1 at a startup of the internal-combustion engine.

When a startup command, which indicates that the operation of the internal-combustion engine 1 should be started, is received by operating a switch or the like (not shown), the electronic control unit 50 carries out the control processing illustrated by the flowchart of FIG. 6.

First, in STEP1, the electronic control unit 50 acquires the detection data on the current intake temperature TA, intake pressure PB and engine temperature TW from the intake temperature sensor 54, the intake pressure sensor 53, and the engine temperature sensor 52, respectively.

Subsequently, in STEP2, the electronic control unit 50 determines a desired effective compression ratio (a desired value of the effective compression ratio) on the basis of the detection values of the intake temperature TA, the intake pressure PB, and the engine temperature TW acquired in STEP 1.

Figure 7:
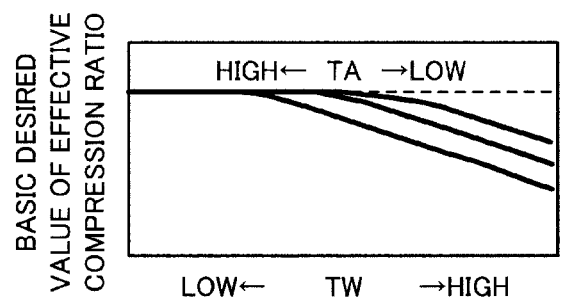
FIG. 7 is a diagram illustrating a map used for the processing in STEP2 of FIG. 6.

The processing is carried out as follows. The electronic control unit 50 first determines the basic desired value of the effective compression ratio according to a map set beforehand, as shown in FIG. 7, from the detection value of the engine temperature TW and the detection value of the intake temperature TA (a substitute value of the ambient temperature).

In this case, the basic desired value of the effective compression ratio is determined on the basis of the engine temperature TW and the intake temperature TA such that the basic desired value of the effective compression ratio tends to be larger in the case where the engine temperature TW is on a low temperature side than in the case where the engine temperature TW is on a high temperature side, and such that the basic desired value of the effective compression ratio tends to be larger in the case where the intake temperature TA (i.e., the ambient temperature) is on the low temperature side than in the case where the intake temperature TA is on the high temperature side.

Figure 8:
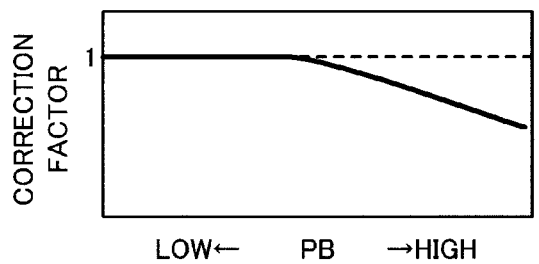
FIG. 8 is a diagram illustrating another map used for the processing in STEP2 of FIG. 6.

Further, the electronic control unit 50 determines a correction factor for correcting the basic desired value of the effective compression ratio from the detection value of the intake pressure PB according to the map set beforehand, as shown in FIG. 8. The correction factor is a coefficient (a positive factor of 1 or less), by which the basic desired value is multiplied. The correction factor is determined on the basis of the detection value of the intake pressure PB such that the value of the correction factor tends to be larger in the case where the intake pressure PB is on a low pressure side (a pressure at a high altitude) than in the case where the intake pressure PB is on a high pressure side (a pressure close to a standard pressure on flatland).

Then, the electronic control unit 50 determines the desired effective compression ratio by multiplying the basic desired value determined as described above by the correction factor.

Thus, the desired effective compression ratio is determined such that the value thereof is larger in the case where the engine temperature TW or the intake temperature TA (ambient temperature) is on the low temperature side than in the case where the engine temperature TW or the intake temperature TA is on the high temperature side, and such that the value thereof is larger in the case where the intake pressure PB (the atmospheric pressure) is on the low pressure side than in the case where the intake pressure PB is on the high pressure side.

In other words, the desired effective compression ratio is determined to increase the effective compression ratio under a condition that makes it difficult to increase the temperature of the air by compression in the combustion chamber 3 of each of the cylinders 2 of the internal-combustion engine 1, as with the case where the ambient temperature is low or the atmospheric pressure is low at the time of starting up the internal-combustion engine 1.

Conversely, the desired effective compression ratio is determined such that the effective compression ratio will not increase much under a condition that tends to cause an excessive temperature rise when the air is compressed in the combustion chamber 3 of each of the cylinders 2 of the internal-combustion engine 1 (under a condition that may cause the combustion of a fuel to start before a proper timing), as with the case where the engine temperature TW is already high at the time of the startup of the internal-combustion engine 1.

The desired effective compression ratio is determined in a range in which the effective compression ratio is feasible when the intake cam for the high load operation, i.e., the large lift intake cam 13H is used as the actual driving intake cam and the phase angle of the large lift intake cam 13H is changed between the phase angle corresponding to the state indicated by the solid line d in FIG. 3 and the phase angle corresponding to the state indicated by the dashed line c in FIG. 3.

After determining the desired effective compression ratio as described above, the electronic control unit 50 carries out the processing in STEP3. In this STEP3, the electronic control unit 50 sets the use permission flag of the intake cam for the low load operation, i.e., the small lift intake cam 13L, to OFF so as to disable the use of the small lift intake cam 13L as the actual driving intake cam.

Further, the electronic control unit 50 determines the desired value of a phase angle θVTC of the actual driving intake cam in STEP4. The desired value is the desired value of θVTC for implementing a desired effective compression ratio. In this case, the use permission flag of the small lift intake cam 13L is OFF. Hence, the electronic control unit 50 determines the desired value of θVTC corresponding to the desired effective compression ratio according to a map (not shown) or an arithmetic expression from the desired effective compression ratio, assuming that the large lift intake cam 13H is to be used as the actual driving intake cam. The desired value of the θVTC is determined such that the phase angle of the open valve period of the intake valve 8 by the large lift intake cam 13H becomes a phase angle closer to the lead angle end as the desired effective compression ratio increases.

Subsequently, the electronic control unit 50 carries out the processing for a startup operation of the internal-combustion engine 1 in STEP5. The startup processing is for starting the combustion of the fuel in the combustion chamber 3 of each of the cylinders 2 of the internal-combustion engine 1.

In this case, the intake valve driving mechanism 9 of the present embodiment is adapted to retain the large lift intake cam 13H as the actual driving intake cam by a hydraulic circuit of the valve lift changing mechanism 11 or an urging means, such as a spring, even if the hydraulic pump using the internal-combustion engine 1 as its driving source is not in operation at the startup of the internal-combustion engine 1.

If an electric pump is provided as the hydraulic source of the valve lift changing mechanism 11 or if the motive power source of the valve lift changing mechanism 11 is an electric motor, then the large lift intake cam 13H may be retained as the actual driving intake cam by running the electric pump or the electric motor at the time of the startup of the internal-combustion engine 1.

Further, the valve phase changing mechanism 10 of the intake valve driving mechanism 9 of the present embodiment is provided with an electric pump as its hydraulic source. The electronic control unit 50 actuates the valve phase changing mechanism 10 by the hydraulic pressure of the electric pump in the aforesaid startup operation processing. This controls the phase angle θVTC of the large lift intake cam 13H serving as the actual driving intake cam to the desired value determined in STEP4.

If the motive power source of the valve phase changing mechanism 10 is an electric motor, then the electric motor may be actuated to control the phase angle θVTC of the large lift intake cam 13H serving as the actual driving intake cam to the desired value determined in STEP4.

Further, in the startup operation processing, the electronic control unit 50 rotatively drives the crankshaft 12 of the internal-combustion engine 1 at a predetermined rotational speed by a starter motor (not shown) in the state wherein the phase angle of the large lift intake cam 13H acting as the actual driving intake cam has been controlled as described above. The electronic control unit 50 further actuates the spark plugs 40 at a predetermined timing while controlling each of the fuel injection valves 33 so as to supply a predetermined amount of fuel for the startup to the combustion chamber 3 of each of the cylinders 2 of the internal-combustion engine 1 from the fuel injection valve 33 corresponding to the cylinder 2. In the startup operation processing, the opening degree of the throttle valve 7 is held at a predetermined degree of opening.

The electronic control unit 50 determines in STEP6 whether the startup of the internal-combustion engine 1 is completed while carrying out the startup operation processing as described above, and repeats the processing from STEP1 until the determination result becomes affirmative. In this case, the determination in STEP6 is carried out on the basis of an output of the rotational speed sensor 51 and the like.

The internal-combustion engine 1 is started up by the control processing described above.

The operation of the internal-combustion engine 1 after the startup will now be described with reference to FIG. 9 and FIG. 10. According to the present embodiment, the operation mode following the startup of the internal-combustion engine 1 comes in a normal mode that permits the switching of the actual driving intake cam and a cam switching inhibition mode that prohibits the use of the small lift intake cam 13L, i.e., the intake cam for the low load operation, as the actual driving intake cam.

Figure 9:
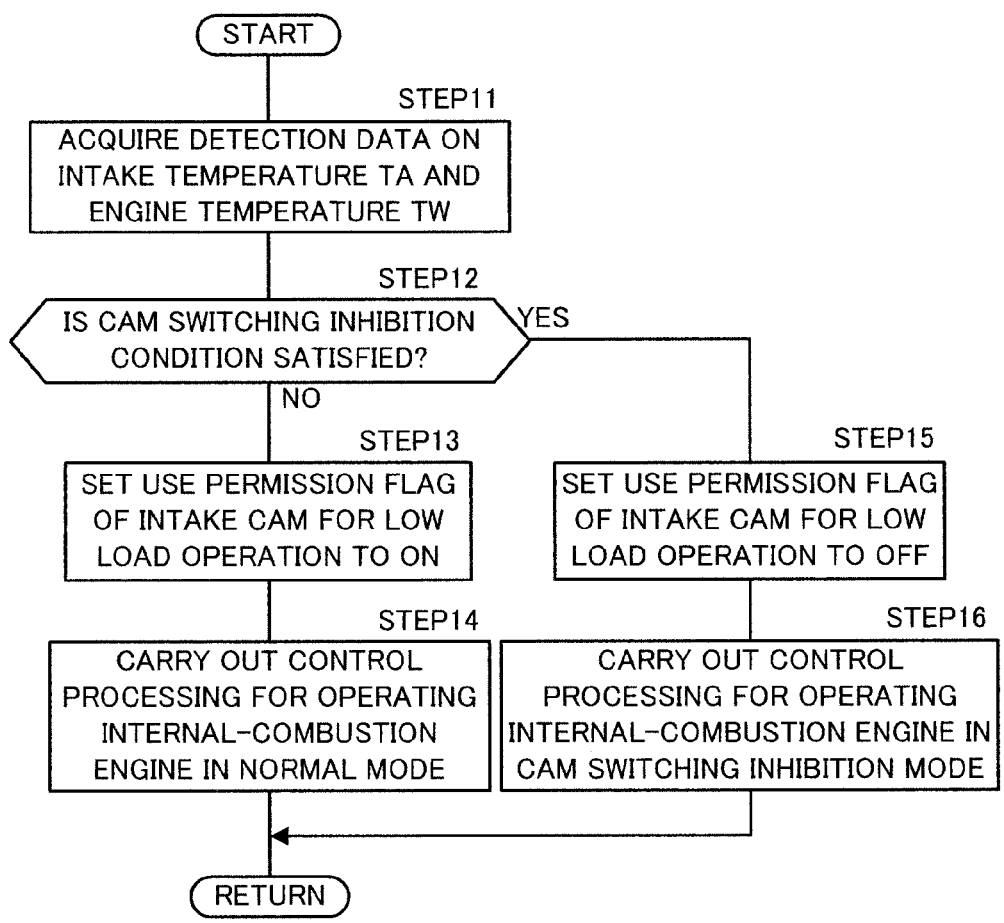
FIG. 9 is a flowchart illustrating the processing carried out by the electronic control unit shown in FIG. 1 while the internal-combustion engine is in operation.

The electronic control unit 50 sequentially carries out the control processing illustrated by the flowchart of FIG. 9 while the internal-combustion engine 1 is in operation so as to perform the switching of the operation mode of the internal-combustion engine 1 and the operation of the internal-combustion engine 1 in whichever operation mode that has been selected.

First, in STEP11, the electronic control unit 50 acquires the detection data on the current intake temperature TA and the engine temperature TW from the intake temperature sensor 54 and the engine temperature sensor 52, respectively.

Then, in STEP12, the electronic control unit 50 determines whether the cam switching inhibition condition for prohibiting the switching of the actual driving intake cam is satisfied. The cam switching inhibition condition is a condition related to the intake temperature TA and the engine temperature TW. Basically, a state in which the detection value of the intake temperature TA (ambient temperature) or the engine temperature TW acquired in STEP11 indicates a relatively low temperature is the state wherein the cam switching inhibition condition is satisfied.

Figure 10:
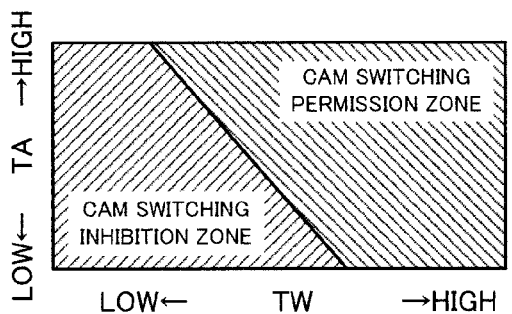
FIG. 10 is a diagram illustrating a map used for the processing in STEP12 of FIG. 9.

To be specific, according to the present embodiment, a cam switching inhibition zone in which the switching of the actual driving intake cam is prohibited and a cam switching permission zone in which the switching of the actual driving intake cam is allowed are established beforehand for a variety of pairs of engine temperature TW and intake temperature TA, as illustrated in FIG. 10. In this case, the cam switching inhibition zone is a zone in which the linearly combined value of TW and TA ($=a \cdot TW + b \cdot TA$, a and b being positive coefficient values set beforehand) is smaller than a predetermined value. Further, the cam switching permission zone is a zone in which the linearly combined value is a predetermined value or more.

In STEP12, the electronic control unit 50 determines that the cam switching inhibition condition is satisfied if the pair of the detection values of the engine temperature TW and the intake temperature TA lies in the cam switching inhibition zone. The electronic control unit 50 determines that the cam switching inhibition condition is not satisfied if the pair of the detection values of the engine temperature TW and the intake temperature TA lies in the cam switching permission zone (if the pair thereof does not lie in the cam switching inhibition zone).

The cam switching inhibition condition may include a condition related to the atmospheric pressure. For example, the predetermined value to be compared with the linearly combined value may be changed according to the detection value of the atmospheric pressure. Based on this, the cam switching inhibition zone may be expanded toward the high temperature zone of TW and TA in the case where the atmospheric pressure is relatively low rather than the case where the atmospheric pressure is relatively high.

In STEP12, if the cam switching inhibition condition is not satisfied, then the electronic control unit 50 sets the use permission flag to ON to enable the usage of the intake cam for the low load operation (the small lift intake cam 13L) as the actual driving intake cam in STEP13. Further, the electronic control unit 50 carries out the control processing in STEP 14 to operate the internal-combustion engine 1 in the normal mode.

Meanwhile, if the cam switching inhibition condition is satisfied in STEP 12, then the electronic control unit 50 sets the use permission flag to OFF in STEP15 so as to prohibit the usage of the intake cam for the low load operation (the small lift intake cam 13L) as the actual driving intake cam. Further, the electronic control unit 50 carries out the control processing in STEP16 to operate the internal-combustion engine 1 in the cam switching inhibition mode.

The control processing in STEP14 and the control processing in STEP16 will be described in further detail with reference to FIGS. 11A to 11F.

First, the control processing in STEP14, namely, the control processing for operating the internal-combustion engine 1 in the normal mode, will be described. The electronic control unit 50 first determines the desired torque (the desired value of an output torque), which means the load required of the internal-combustion engine 1 (the required load), according to the characteristic indicated by the solid line in the graph of FIG. 11A on the basis of the accelerator manipulated variable AP detected by the acceleration sensor 55. In this case, the desired torque is determined such that it increases as the accelerator manipulated variable AP increases.

Figure 11A:
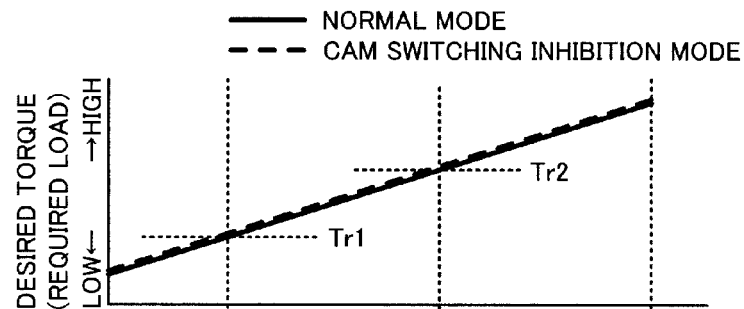
FIG. 11A is a graph illustrating the processing in STEP14 and STEP16 of FIG. 9.
Figure 11B:
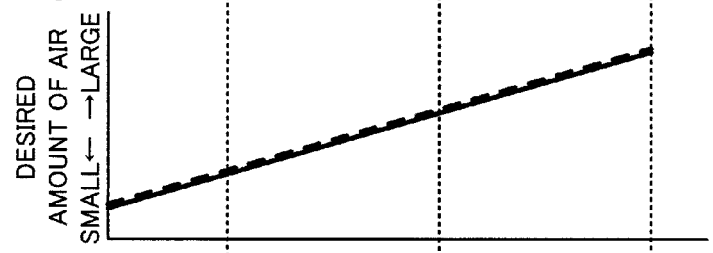
FIG. 11B is a graph illustrating the processing in STEP14 and STEP16 of FIG. 9.

Then, based on the desired torque (or the detection value of the accelerator manipulated variable AP), the electronic control unit 50 determines a desired amount of air, which is the desired value of the flow of air to be supplied to the combustion chamber 3 of each of the cylinders 2 of the internal-combustion engine 1, according to the characteristic indicated by the solid line in the graph of FIG. 11B. The desired amount of air is determined such that it increases as the desired torque increases, i.e., as the load on the internal-combustion engine 1 increases. The desired amount of air is determined such that it changes according not only to the desired torque of the internal-combustion engine 1 but also the rotational speed NE of the internal-combustion engine 1. In this case, more specifically, if the desired torque remains unchanged, the desired amount of air is determined such that it increases as the detection value of the rotational speed NE of the internal-combustion engine 1 increases.

Figure 11C:
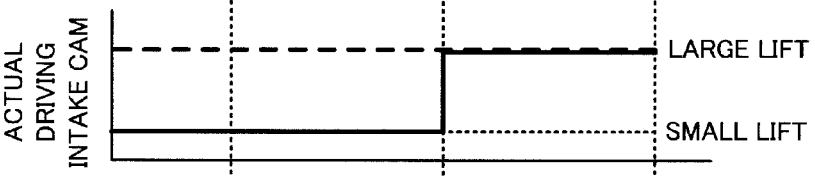
FIG. 11C is a graph illustrating the processing in STEP14 and STEP16 of FIG. 9.

Further, the electronic control unit 50 decides on the intake cam 13L or 13H to be used as the actual driving intake cam on the basis of the desired torque (or on the basis of the accelerator manipulated variable AP) according to the characteristic indicated by the solid line in the graph of FIG. 11C. The electronic control unit 50 further determines the desired value of the phase angle θVTC of the actual driving intake cam and the desired throttle degree of opening, which is the desired value of the degree of opening of the throttle valve 7, on the basis of the desired torque (or on the basis of the accelerator manipulated variable AP) according to the characteristics indicated by the solid lines in the graphs of FIG. 11D and FIG. 11E.

In this case, regarding the actual driving intake cam, if the desired torque is larger than a torque Tr2 of a predetermined value shown in FIG. 11A, which means that a required load is relatively high, then the large lift intake cam 13H for the high load operation (indicated by the solid line in the graph of FIG. 11C) will be selected as the actual driving intake cam. Conversely, if the desired torque is smaller than a torque Tr2, which means that a required load is relatively low, then the small lift intake cam 13L for the low load operation (indicated by the solid line in the graph of FIG. 11C) will be selected as the actual driving intake cam.

Figure 11D:
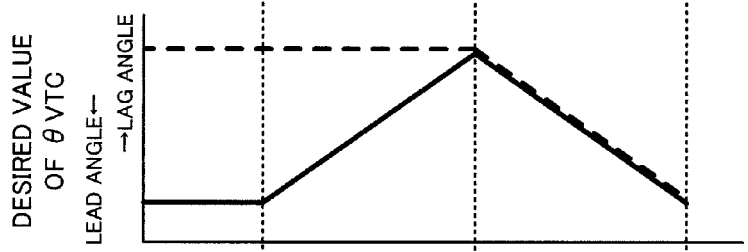
FIG. 11D is a graph illustrating the processing in STEP 14 and STEP 16 of FIG. 9.

Regarding the desired value of the phase angle θVTC of the actual driving intake cam, if the desired torque is larger than the torque Tr2, which means that a required load is relatively high, then the desired value of the phase angle θVTC of the large lift intake cam 13H acting as the actual driving intake cam is determined such that, as indicated by the solid line in the graph of FIG. 11D, the desired value changes in the lead angle direction from the phase angle corresponding to the state indicated by the dashed line c in FIG. 3 (the utmost phase angle on the lag angle side) as the desired torque increases. In other words, the desired value of the phase angle θVTC of the large lift intake cam 13H is determined such that the effective compression ratio implemented by the opening/closing of the intake valve 8 by the large lift intake cam 13H increases from the effective compression ratio corresponding to the state indicated by the dashed line c in FIG. 3 as the desired torque increases.

Further, in the case where the desired torque is smaller than the torque Tr2, i.e., if the required load is relatively low, if the desired torque is smaller than a torque Tr1 (<Tr2) of a predetermined value shown in FIG. 11A, then the desired value of the phase angle θVTC of the small lift intake cam 13L acting as the actual driving intake cam is determined such that, as indicated by the solid line in the graph of FIG. 11D, the desired value of θVTC is maintained at a phase angle corresponding to the situation indicated by the solid line a in FIG. 3 (the utmost phase angle on the lead angle side). In other words, the desired value of the phase angle θVTC of the small lift intake cam 13L is determined such that the effective compression ratio implemented by the opening/closing of the intake valve 8 by the small lift intake cam 13L is maintained at the effective compression ratio corresponding to the state indicated by the solid line a in FIG. 3.

Further, if the desired torque falls in the range between the torques Tr1 and Tr2, then the desired value of the phase angle θVTC of the small lift intake cam 13L acting as the actual driving intake cam is determined such that it changes in the lag angle direction from the utmost phase angle on the lead angle side to the utmost phase angle on the lag angle side as the desired torque increases. In other words, the desired value of the phase angle θVTC of the small lift intake cam 13L is determined such that the effective compression ratio implemented by the opening/closing of the intake valve 8 by the small lift intake cam 13L increases from the effective compression ratio corresponding to the state indicated by the solid line a in FIG. 3 to the effective compression ratio corresponding to the state indicated by the dashed line b in FIG. 3 as the desired torque increases.

Figure 11E:
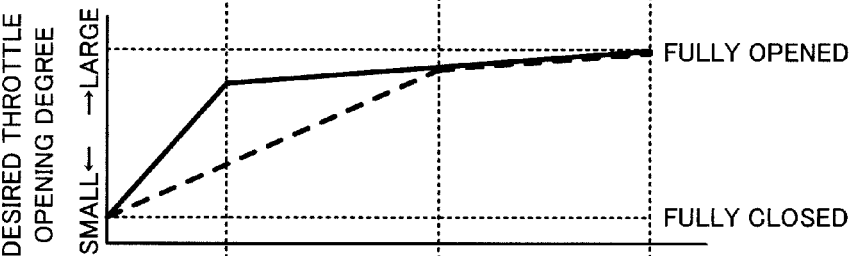
FIG. 11E is a graph illustrating the processing in STEP14 and STEP16 of FIG. 9.
Figure 11F:
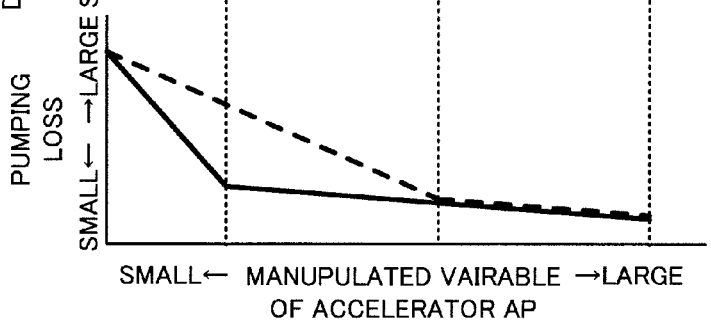
FIG. 11F is a graph illustrating the processing in STEP14 and STEP16 of FIG. 9.

Further, regarding a desired throttle opening degree, if the desired torque is larger than the predetermined value Tr1, i.e., if the operation zone of the internal-combustion engine 1 is the operation zone in which the phase angle of the actual driving intake cam and consequently the effective compression ratio are changed according to the desired torque, then the desired throttle opening degree is determined such that it is maintained at an opening degree at full throttle or an opening degree in the vicinity thereof, as indicated by the solid line in the graph of FIG. 11E.

This is to change the phase angle of the actual driving intake cam (to consequently change the effective compression ratio) while maintaining the throttle opening degree at full throttle or an opening degree in the vicinity thereof in the operation zone, thereby controlling the amount of air charged into the combustion chamber 3 of each of the cylinders 2 of the internal-combustion engine 1 to the desired amount of air. This consequently minimizes a pumping loss caused by decreasing the opening degree of the throttle valve in the operation zone, as indicated by the solid line in the graph of FIG. 11F.

If the desired torque is smaller than the predetermined value Tr1, then the effective compression ratio is held at a lower limit effective compression ratio (the effective compression ratio corresponding to the state indicated by the solid line a in FIG. 3). Thus, the desired throttle opening degree is determined such that it decreases as the desired torque decreases, as indicated by the solid line in the graph of FIG. 11E, in order to adjust the amount of air charged into the combustion chamber 3 of each of the cylinders 2 of the internal-combustion engine 1 by the throttle valve 7.

Then, the electronic control unit 50 controls the valve lift changing mechanism 11 by using, as the actual driving intake cam, the intake cam 13L or 13H selected as described above. The electronic control unit 50 further controls the supply of the fuel to the combustion chamber 3 of each of the cylinders 2 by the fuel injection valve 33 and the ignition by the spark plug 40 while at the same time controlling the actual phase angle θVTC of the actual driving intake cam and the actual opening degree of the throttle valve 7 on the basis of the desired amount of air determined as described above, the desired value of the actual phase angle θVTC of the actual driving intake cam, and the desired throttle opening degree.

In this case, the actual phase angle θVTC of the actual driving intake cam and the actual opening degree of the throttle valve 7 are controlled to a phase angle and an opening degree obtained by adjusting, as necessary, the basic values, which are the desired values determined as described above, on the basis of the difference between the desired amount of air and the actual air flow in the intake passage 4 detected by a flow sensor (not shown).

Further, the fuel injection amount of the fuel injection valve 33 and the ignition timing of the spark plug 40 are controlled to the desired values determined according to a predetermined map or the like on the basis of the detection value of the actual air flow in the intake passage 4 or the detection value of the rotational speed NE of the internal-combustion engine 1, the detection value of the intake pressure PB and the like.

The description of the control processing in STEP14, namely, the control processing for operating the internal-combustion engine 1 in the normal mode, has now been completed.

The control processing in STEP16, namely, the control processing for operating the internal-combustion engine 1 in the cam switching inhibition mode, will now be described. The electronic control unit 50 first determines the desired torque of the internal-combustion engine 1 on the basis of the accelerator manipulated variable AP detected by the acceleration sensor 55 according to the characteristic indicated by the dashed line in the graph of FIG. 11A. In this case, the desired torque determined on the basis of the accelerator manipulated variable AP is the same as that in the case of the normal mode.

Subsequently, based on the desired torque (or the detection value of the accelerator manipulated variable AP), the electronic control unit 50 determines a desired amount of air, which is the desired value of the amount of air to be supplied to the combustion chamber 3 of each of the cylinders 2 of the internal-combustion engine 1, according to the characteristic indicated by the dashed line in the graph of FIG. 11B. In this case, the desired amount of air determined on the basis of each desired torque (or each accelerator manipulated variable AP) is the same as that in the case of the normal mode.

Further, as indicated by the dashed line in the graph of FIG. 11C, the electronic control unit 50 holds the large lift intake cam 13H for the high load operation as the intake cam decided to be the actual driving intake cam independently of the desired torque, i.e., independently of the load on the internal-combustion engine 1.

Further, the electronic control unit 50 determines the desired value of the phase angle θVTC of the actual driving intake cam and the desired throttle opening degree, which is the desired value of the opening degree of the throttle valve 7, according to the characteristics indicated by the dashed lines in the graphs of FIG. 11D and FIG. 11E, respectively.

In this case, regarding the desired value of the phase angle θVTC of the large lift intake cam 13H acting as the actual driving intake cam, if the desired torque is larger than the torque Tr2, which means that the required load is relatively high, then the desired value of the phase angle θVTC of the large lift intake cam 13H is determined to be the same desired value as that in the case of the normal mode, as indicated by the dashed line in the graph of FIG. 11D. Hence, the desired value of θVTC is determined such that it changes in the lead angle direction from the phase angle corresponding to the state indicated by the dashed line c in FIG. 3, i.e., such that the effective compression ratio increases from the effective compression ratio corresponding to the state indicated by the dashed line c in FIG. 3, as the desired torque increases.

If the desired torque is smaller than the torque Tr2, which means that the required load is relatively low, then the desired value of the phase angle θVTC of the large lift intake cam 13H acting as the actual driving intake cam is determined such that, as indicated by the dashed line in the graph of FIG. 11D, the desired value of θVTC is maintained at a phase angle corresponding to the situation indicated by the dashed line c in FIG. 3 (the utmost phase angle on the lag angle side). In other words, the desired value of the phase angle θVTC of the large lift intake cam 13H is determined such that the effective compression ratio implemented by the opening/closing of the intake valve 8 by the large lift intake cam 13H is maintained at the effective compression ratio corresponding to the state indicated by the dashed line c in FIG. 3.

Regarding a desired throttle opening degree, if the desired torque is larger than the predetermined value Tr2, i.e., if the operation zone of the internal-combustion engine 1 is the operation zone in which the phase angle of the actual driving intake cam and consequently the effective compression ratio are changed according to the desired torque, then the desired throttle opening degree is determined to be the same desired value as that in the case of the normal mode (the opening degree at full throttle or an opening degree in the vicinity thereof), as indicated by the dashed line in the graph of FIG. 11E.

If the desired torque is smaller than the predetermined value Tr2, then the effective compression ratio is held at the effective compression ratio corresponding to the state indicated by the dashed line c in FIG. 3. Thus, the desired throttle opening degree is determined such that it decreases as the desired torque decreases, as indicated by the dashed line in the graph of FIG. 11E, in order to adjust the amount of air charged into the combustion chamber 3 of each of the cylinders 2 of the internal-combustion engine 1 by the throttle valve 7. The desired throttle opening degree in this case is determined to be smaller than the desired throttle opening degree in the normal mode.

Then, the electronic control unit 50 controls the valve lift changing mechanism 11 by using the large lift intake cam 13H as the actual driving intake cam. The electronic control unit 50 further controls the supply of the fuel to the combustion chamber 3 of each of the cylinders 2 by the fuel injection valve 33 and the ignition by the spark plug 40 while at the same time controlling the actual phase angle θVTC of the actual driving intake cam and the actual opening degree of the throttle valve 7 on the basis of the desired amount of air determined, the desired value of the phase angle θVTC of the actual driving intake cam, and the desired throttle opening degree, as described above.

In this case, as with the case of the normal mode, the actual phase angle θVTC of the actual driving intake cam and the actual opening degree of the throttle valve 7 are controlled to a phase angle and an opening degree obtained by adjusting, as necessary, the basic values, which are the desired values determined as described above, on the basis of the difference between the desired amount of air and the actual air flow in the intake passage 4 detected by a flow sensor (not shown).

Further, as with the case of the normal mode, the fuel injection amount of the fuel injection valve 33 and the ignition timing of the spark plug 40 are controlled to the desired values determined according to a predetermined map or the like on the basis of the detection value of the actual air flow in the intake passage 4 or the detection value of the rotational speed NE of the internal-combustion engine 1, the detection value of the intake pressure PB and the like.

The description of the control processing in STEP16, namely, the control processing for operating the internal-combustion engine 1 in the cam switching inhibition mode, has now been completed.

Supplementarily, in the present embodiment, the large lift intake cam 13H and the small lift intake cam 13L correspond to the first intake cam and the second intake cam, respectively, in the first to the sixth aspects of the invention described above.

Further, the electronic control unit 50 includes the functions as the intake cam switching control unit, the cam phase control unit, and the throttle control unit in the first to the sixth aspects of the invention. In this case, the function as the intake came switching control unit is implemented by the function for holding the large lift intake cam 13H as the actual driving intake cam in the processing illustrated by the flowchart of FIG. 6 and the function for holding the large lift intake cam 13H as the actual driving intake cam in STEP16 if the cam switching inhibition condition is satisfied or for switching the actual driving intake cam, as necessary, in STEP14 if the cam switching inhibition condition is not satisfied in the processing illustrated by the flowchart of FIG. 9.

The function as the cam phase control unit is implemented by the function for variably controlling the phase angle θVTC of the actual driving intake cam in the processing illustrated in FIG. 6 and the function for variably controlling the phase angle θVTC of the actual driving intake cam in STEP 14 and STEP 16 of the flowchart of FIG. 9.

Further, a phase angle A1 shown in FIG. 3 corresponds to the first lead angle side valve opening start phase angle and the second lead angle side valve opening start phase angle in the first to the sixth aspects of the invention. A phase angle A2 corresponds to the first lag angle side valve opening start phase angle and the second lag angle side valve opening start phase angle in the first to the sixth aspects of the invention.

The state in which the phase angles of the intake cams 13L and 13H have been controlled to the states indicated by the dashed lines b and c in FIG. 3 corresponds to the specific state in the present invention. The desired torque of the predetermined value Tr2 shown in FIG. 11 corresponds to the cam switching load in the first to the sixth aspects of the invention.

The function as the throttle control unit is implemented by the function for determining a desired throttle opening degree according to the characteristic indicated by the graph in FIG. 11E and then controlling the opening degree of the throttle valve 7 to the desired throttle opening degree in STEP 14 and STEP 16 of the flowchart in FIG. 9.

According to the present embodiment described above, while the internal-combustion engine 1 is operating in the normal mode, the operational state of the intake valve 8, namely, the phase angle and the lift amount in the open valve period, change as follows according to the load on the internal-combustion engine 1, i.e., the desired torque.

For example, in the case where the load on the internal-combustion engine 1 increases from the low load side to the high load side, the small lift intake cam 13L is used as the actual driving intake cam in the state wherein the load on the internal-combustion engine 1 is relatively low, i.e., in the state wherein the desired torque is smaller than the predetermined value Tr2. When the desired torque exceeds the predetermined value Tr1, the phase angle θVTC of the small lift intake cam 13L continuously changes from the lead angle side to the lag angle side as the load on the internal-combustion engine 1 increases.

Hence, the operational state of the intake valve 8 continuously changes from the state indicated by the solid line a to the state indicated by the dashed line b in FIG. 3 (refer to an arrow Y1 in FIG. 3). Thus, the effective compression ratio of the combustion chamber 3 of each of the cylinders 2 increases.

Thereafter when the phase angle θVTC of the small lift intake cam 13L lags to the utmost phase angle on the lag angle side, causing the operational state of the intake valve 8 to reach the state indicated by the dashed line b in FIG. 3, the actual driving intake cam is switched from the small lift intake cam 13L to the large lift intake cam 13H. At this time, the phase angle θVTC of the large lift intake cam 13H also reaches the utmost phase angle on the lag angle side. Thus, the operational state of the intake valve 8 is changed from the state indicated by the dashed line b to the state indicated by the dashed line c in FIG. 3, causing the lift amount to increase and also the angle width in the open valve period to increase (refer to an arrow Y2 in FIG. 3).

In this case, in the state wherein the θVTC has lagged to the utmost phase angle on the lag angle side, the effective compression ratio of the combustion chamber 3 of each of the cylinders 2 and consequently the amount of air charged into the combustion chamber 3 will be the same or substantially the same in both the case where the small lift intake cam 13L is used as the actual driving intake cam and the case where the large lift intake cam 13H is used as the actual driving intake cam, as described above.

Therefore, when the actual driving intake cam is switched, the amount of air charged into the combustion chamber 3 of each of the cylinders 2 will be maintained substantially at a constant level before and after the switching. Further, there will be no sudden change in the phase angles of the intake cams 13L and 13H before and after the switching. As a result, switching the actual driving intake cam will not cause discontinuous fluctuations (stepped fluctuations) in the output torque of the internal-combustion engine 1. In addition, the switching can be promptly completed.

Further, the phase angle at the start of the opening of the intake valve 8 immediately before the actual driving intake cam is switched and the phase angle at the start of the opening of the intake valve 8 immediately after the switching both lie between the top dead center and the bottom dead center. This obviates a sudden change in the amount of an exhaust gas (an exhaust gas recirculated by the EGR unit 25) charged together with air into the combustion chamber 3 of each of the cylinders 2 during the open valve period of the intake valve 8 before and after the switching.

Further, according to the present embodiment, after the actual driving intake cam is switched to the large lift intake cam 13H because of an increase in the load, i.e., an increase in the desired torque, of the internal-combustion engine 1, the phase angle θVTC of the large lift intake cam 13H continuously changes from the lag angle side to the lead angle side as the load, i.e., the desired torque, of the internal-combustion engine 1 increases. Hence, the operational state of the intake valve 8 continuously changes from the state indicated by the dashed line c to the state indicated by the solid line d in FIG. 3 (refer to an arrow Y3 in FIG. 3). This causes the effective compression ratio of the combustion chamber 3 of each of the cylinders 2 to further increase.

As described above, according to the present embodiment, when the load on the internal-combustion engine 1 increases from the low load side to the high load side while the internal-combustion engine 1 is running in the normal mode, the effective compression ratio of the combustion chamber 3 of each of the cylinders 2 and the amount of air charged into the combustion chamber 3 during the open valve period of the intake valve 8 smoothly increase without changing in steps. Moreover, a sudden change in steps in the amount of the exhaust gas charged into the combustion chamber 3 of each of the cylinders 2 before and after the switching of the actual driving intake cam will be prevented.

As a result, the output torque of the internal-combustion engine 1 can be smoothly increased without causing the occurrence of a misfire of the internal-combustion engine 1.

In the case where the load on the internal-combustion engine 1 decreases from the high load side to the low load side while the internal-combustion engine 1 is running in the normal mode, the change in the operational state of the intake valve 8 will be reversed from that in the case where the load on the internal-combustion engine 1 increases. More specifically, in the case of the high load operation of the internal-combustion engine 1, the intake valve 8 is opened/closed by the large lift intake cam 13H. Further, the phase angle of the intake valve 8 in the open valve period changes in the lag angle direction from the state indicated by the solid line d to the state indicated by the dashed line c in FIG. 3 as the load on the internal-combustion engine 1 decreases.

Then, the actual driving intake cam is switched from the large lift intake cam 13H to the small lift intake cam 13L in the state wherein the phase angles θVTC of both intake cams 13L and 13H have been controlled to the phase angles (the utmost phase angles on the lag angle side) corresponding to the states indicated by the dashed lines b and c, respectively.

In the low load operation of the internal-combustion engine 1 thereafter, the intake valve 8 is opened/closed by the small lift intake cam 13L. Further, the phase angle of the intake valve 8 in the open valve period changes in the lead angle direction from the state indicated by the dashed line b to the state indicated by the solid line a in FIG. 3 as the load on the internal-combustion engine 1 decreases.

Thus, also when the load on the internal-combustion engine 1 decreases from the high load side to the low load side, the effective compression ratio of the combustion chamber 3 of each of the cylinders 2 or the amount of air charged into the combustion chamber 3 during the open valve period of the intake valve 8 smoothly decreases without changing in steps, as with the case where the load increases. Moreover, sudden changes in steps in the amount of the exhaust gas charged into the combustion chamber 3 of each of the cylinders 2 will be prevented before and after the switching of the actual driving intake cam. As a result, the output torque of the internal-combustion engine 1 can be smoothly decreased without causing the occurrence of a misfire of the internal-combustion engine 1.

As the load on the internal-combustion engine 1 increases or decreases, the effective compression ratio of the combustion chamber 3 of each of the cylinders 2 increases or decreases accordingly. This makes it possible to restrain the change amount of the throttle valve 7 relative to the change in the load on the internal-combustion engine 1. As a result, the opening degree of the throttle valve 7 can be maintained at full throttle or a large opening degree in the vicinity thereof over an extensive load range of the internal-combustion engine 1 (specifically, a load range in which the desired torque is Tr1 or more), thus making it possible to reduce the pumping loss of the internal-combustion engine 1 thereby to restrain fuel consumption.

Further, when the internal-combustion engine 1 is operating in the cam switching inhibition mode, i.e., when the internal-combustion engine 1 is operating in a low temperature environment, in which the engine temperature TW of the internal-combustion engine 1 or the intake temperature TA (the ambient temperature) is relatively low, the use of the small lift intake cam 13L for the low load operation is prohibited, and the large lift intake cam 13H for the high load operation is held as the actual driving intake cam.

Hence, the effective compression ratio of the combustion chamber 3 of each of the cylinders 2 of the internal-combustion engine 1 is always maintained at a relatively high compression ratio equal to or higher than the effective compression ratio that corresponds to the state indicated by the dashed line c in FIG. 3. This leads to a sufficient temperature rise attributable to the compression of air charged into the combustion chamber 3 of each of the cylinders 2 also in the low load operation as well as the high load operation of the internal-combustion engine 1. As a result, the occurrence of a misfire of the fuel supplied to the combustion chamber 3 can be prevented, thus allowing the proper operation of the internal-combustion engine 1 to be stably accomplished.

When the internal-combustion engine 1 is operating in the cam switching inhibition mode, the pumping loss increases in the low load operation, in which the desired torque is smaller than the predetermined value Tr2, as compared with the case of the normal mode. Meanwhile, in the high load operation, in which the desired torque exceeds the predetermined value Tr2, the effective compression ratio is changed by changing the phase angle θVTC of the large lift intake cam 13H, as with the normal mode. This makes it possible to maintain the opening degree of the throttle valve 7 at a full throttle or an opening degree in the vicinity thereof. Thus, the pumping loss can be reduced and the fuel consumption can be therefore restrained.

At the startup of the internal-combustion engine 1, the large lift intake cam 13H for the high load operation is held as the actual driving intake cam, as with the case of the operation of the internal-combustion engine 1 in the cam switching inhibition mode.

Thus, in the case where the engine temperature TW or the intake temperature TA (ambient temperature) is relatively low or in the case where the intake pressure PB (atmosphere pressure) is relatively low, the phase angle of the large lift intake cam 13H acting as the actual driving intake cam is controlled such that the effective compression ratio of the combustion chamber 3 of each of the cylinders 2 of the internal-combustion engine 1 becomes a large compression ratio.

Hence, even when the internal-combustion engine 1 is started up in a low temperature environment, such as a cold place or the winter, or in a low pressure environment, such as a place at a high altitude, the temperature of the air charged into the combustion chamber 3 of each of the cylinders 2 can be sufficiently increased by the compression thereof. This permits a smooth start of the combustion of the fuel mixed in the air.

In the case where the engine temperature TW or the intake temperature TA (ambient temperature) is relatively high or in the case where the intake pressure PB (atmosphere pressure) is relatively low, the phase angle of the large lift intake cam 13H acting as the actual driving intake cam is controlled such that the effective compression ratio of the combustion chamber 3 of each of the cylinders 2 of the internal-combustion engine 1 becomes a small compression ratio.

This arrangement makes it possible to prevent the temperature of the air charged into the combustion chamber 3 of each of the cylinders 2 from excessively rising due to the compression thereof in a high temperature environment, such as a condition immediately after the operation of the internal-combustion engine 1 is stopped, or at the startup of the internal-combustion engine 1 in a high pressure environment. As a result, the occurrence of knocking or the like due to abnormal combustion of the fuel mixed in the air can be prevented.

In the present embodiment, the phase angle at the start of opening the intake valve 8 by the large lift intake cam 13H at the time of switching the actual driving intake cam (the utmost phase angle on the lag angle side) and the phase angle at the start of the opening of the intake valve 8 by the small lift intake cam 13L (the utmost phase angle on the lag angle side) have been set to the same phase angle, namely, A2 in FIG. 3. Alternatively, however, the phase angles may be slightly different from each other.

Further, the phase angle at the start of the opening of the intake valve 8 by the large lift intake cam 13H (the utmost phase angle on the lead angle side) and the phase angle at the start of the opening of the intake valve 8 by the small lift intake cam 13L (the utmost phase angle on the lead angle side) may be set to phase angles that are different from each other.

Second Embodiment

An embodiment of a reference example related to the present invention will now be described as a second embodiment with reference to FIG. 12 and FIG. 13. The present embodiment differs from the first embodiment only partly in the construction of an intake valve driving mechanism 9 and control processing, so that the description will be focused on the different aspects, and the description of the same constructions and control processing as those of the first embodiment will not be repeated.

In the intake valve driving mechanism 9 in the present embodiment, the profiles of a small lift intake cam 13L and a large lift intake cam 13H are different from those of the first embodiment. The rest of the construction of the intake valve driving mechanism 9 is the same as the construction of the first embodiment.

Figure 12:
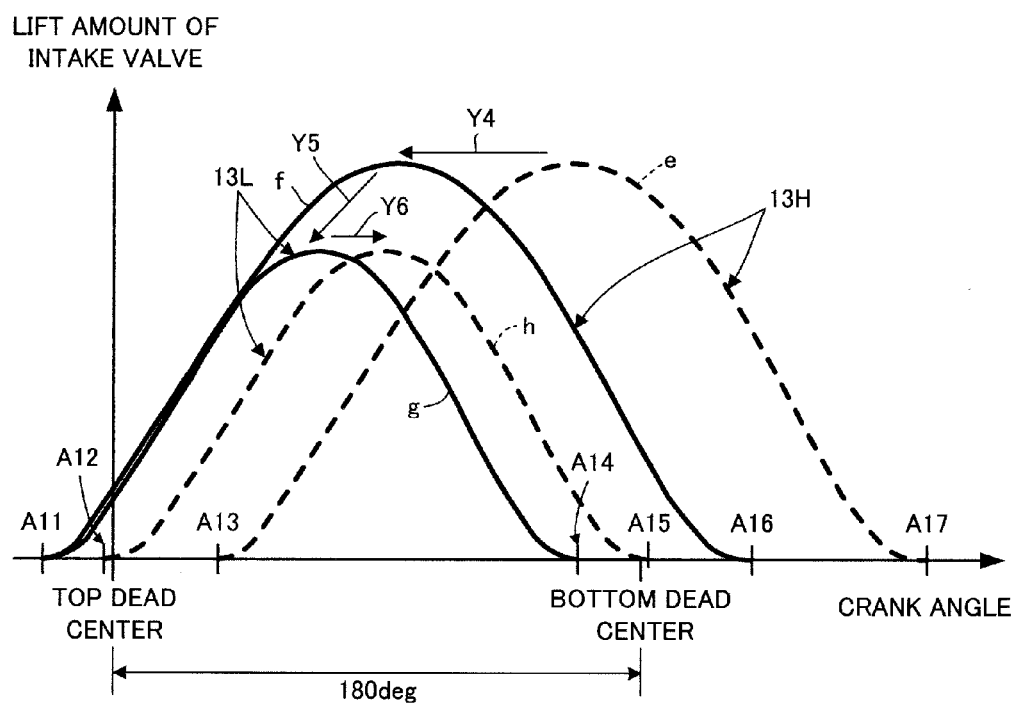
FIG. 12 is a graph illustrating the driving characteristics of an intake valve of an internal-combustion engine of another embodiment (a second embodiment) related to the present invention.

More specifically, referring to FIG. 12, the profile of the large lift intake cam 13H in the present embodiment is set such that the angle width in the open valve period of an intake valve 8 becomes larger than the angular difference between the phase angle at the top dead center of a piston 15 of each of the cylinders 2 and the phase angle at the bottom dead center thereof (=180 degrees), as indicated by the solid line f in FIG. 12. The profile of the large lift intake cam 13H is set such that the angle width in the open valve period of the intake valve 8 becomes, for example, approximately 260 degrees.

Further, as indicated by the solid line g in FIG. 12, the profile of the small lift intake cam 13L is set such that the angle width in the open valve period of the intake valve 8 by the small lift intake cam 13L becomes an angle width that is closer to the angular difference between the phase angle at the top dead center and the phase angle at the bottom dead center, namely, 180 degrees, than the angle width in the open valve period of the intake valve 8 by the large lift intake cam 13H. More specifically, the angle width in the open valve period of the intake valve 8 by the small lift intake cam 13L is set to, for example, an angle width that is slightly larger than the angular difference (180 degrees) between the phase angle at the top dead center and the phase angle at the bottom dead center (e.g., approximately 200 degrees).

The maximum lift amount of the intake valve 8 by the small lift intake cam 13L in the present embodiment is approximately the same as the maximum lift amount of the intake valve 8 by the large lift intake cam 13H in the first embodiment. Accordingly, the maximum lift amount of the intake valve 8 by the large lift intake cam 13H in the present embodiment is yet larger than the maximum lift amount of the intake valve 8 by the large lift intake cam 13H in the first embodiment.

As with the first embodiment, the present embodiment also enables the actual driving intake cam, which actually opens/closes the intake valve 8, to be selectively switched to either the small lift intake cam 13L or the large lift intake cam 13H by the valve lift changing mechanism 11 of the intake valve driving mechanism 9. Further, the phase angles of the intake cams 13L and 13H (i.e., the phase angle of the open valve period of the intake valve 8) relative to the phase angle of a crankshaft 12 can be continuously changed within a predetermined range by a valve phase changing mechanism 10.

The profiles of the intake cams 13L and 13H and the opening modes of the intake valve 8 implemented by changes in the phase angles of the intake cams 13L and 13H and the switching between the intake cams 13L and 13H in the present embodiment will be described in more detail.

In the present embodiment, the intake cams 13L and 13H rotate integrally with an intake cam shaft 14, as with the first embodiment. Hence, the mutual phase relationship between the intake cams 13L and 13H, i.e., the mutual phase relationship between the open valve periods of the intake valve 8 by the intake cams 13L and 13H, is maintained constant.

In this case, as with the first embodiment, the mutual phase relationship between the intake cams 13L and 13H is set such that the phase angle at the start of the opening of the intake valve 8 by the intake cam 13L and the phase angle at the start of the opening of the intake valve 8 by the intake cam 13H are the same with each other (refer to the solid lines f and g in FIG. 12).

Further, according to the present embodiment, the changes in the phase angles of the intake cams 13L and 13H (i.e., the changes in the phase angles of the open valve periods of the intake valve 8 by the intake cams 13L and 13H, respectively) take place within the range between the phase angle corresponding to the state indicated by the solid line f in FIG. 12 and the phase angle corresponding to the state indicated by the dashed line e in FIG. 12 in the case where the intake valve 8 is opened/closed by the large lift intake cam 13H.

Further, the phase angles of the intake cams 13L and 13H are changed within the range between the phase angle corresponding to the state indicated by the solid line g in FIG. 12 and the phase angle corresponding to the state indicated by the dashed line h in FIG. 12 in the case where the intake valve 8 is opened/closed by the small lift intake cam 13L.

The phase angle at the start of the opening of the intake valve 8 in the state indicated by the solid line f in FIG. 12 (the phase angle at the start of the opening of the intake valve 8 by the large lift intake cam 13H) and the phase angle at the start of the opening of the intake valve 8 in the state indicated by the solid line g in FIG. 12 (the phase angle at the start of the opening of the intake valve 8 by the small lift intake cam 13L) coincide with each other. These states are the states in which the phase angles of the intake cams 13L and 13H have been controlled to the utmost phase angles on the lead angle side.

The phase angle at the start of the opening of the intake valve 8 in the aforesaid state is set to a predetermined phase angle A11 on the lead angle side relative to the top dead center for both the intake cams 13L and 13H. The phase angle A11 is set to be on the lead angle side by, for example, approximately 40 degrees from the phase angle at the top dead center.

Further, the angle width in the open valve period of the intake valve 8 by each of the intake cams 13L and 13H and the phase angle A11 at the start of the opening of the intake valve 8 in the state indicated by the solid lines f and g in FIG. 12 are set as described above. Therefore, a phase angle A16 at the end of opening of the intake valve 8 by the large lift intake cam 13H will be on the lag angle side relative to the phase angle at the bottom dead center (on the lag angle side by approximately 40 degrees from the phase angle at the bottom dead center in the present embodiment) in the state indicated by the solid line f in FIG. 12 related to the large lift intake cam 13H.

Further, in the state indicated by the solid line g in FIG. 12 related to the small lift intake cam 13L, a phase angle 14A at the end of opening of the intake valve 8 by the small lift intake cam 13L will be on the lead angle side relative to the phase angle at the bottom dead center (on the lead angle side by approximately 20 degrees from the phase angle at the bottom dead center in the present embodiment).

Supplementarily, the phase angle at the start of the opening of the intake valve 8 by the large lift intake cam 13H and the phase angle at the start of the opening of the intake valve 8 by the small lift intake cam 13L in the state, wherein the phase angles of the intake cams 13L and 13H have been controlled to the utmost phase angles on the lead angle side, do not have to precisely coincide with each other and may have a slight difference.

The state indicated by the dashed line e in FIG. 12 is the state wherein the phase angle of the large lift intake cam 13H has been controlled to the utmost phase angle on the lag angle side in the case where the intake valve 8 is opened/closed by the large lift intake cam 13H. In this state, a phase angle A13 at the start of the opening of the intake valve 8 opened/closed by the large lift intake cam 13H is a predetermined phase angle that is on the lag angle side relative to the phase angle A11 and between the phase angle at the top dead center and the phase angle at the bottom dead center.

The phase angle A13 in the present embodiment is set to a phase angle that is delayed by, for example, approximately 60 degrees, from the phase angle A11 at the start of the opening of the intake valve 8 in the state indicated by the solid line f in FIG. 12.

In this state, a phase angle A17 at the end of opening of the intake valve 8 opened/closed by the large lift intake cam 13H is more delayed than the phase angle A16 at the end of opening of the intake valve 8 in the state indicated by the solid line f.

The state indicated by the dashed line h in FIG. 12 is the state wherein the phase angle of the small lift intake cam 13L has been controlled to the utmost phase angle on the lag angle side in the case where the intake valve 8 is opened/closed by the small lift intake cam 13L. In this state, a phase angle A12 at the start of the opening of the intake valve 8 opened/closed by the small lift intake cam 13L is a predetermined phase angle that is on the lag angle side relative to the phase angle A11.

The phase angle A12 in the present embodiment is set to be a phase angle that is delayed by, for example, approximately 30 degrees from the phase angle A11 at the start of the opening of the intake valve 8 in the state indicated by the solid line g in FIG. 12. Hence, in the state indicated by the dashed line h in FIG. 12 related to the small lift intake cam 13L, a phase angle A15 at the end of opening of the intake valve 8 is set to a phase angle that has a sufficiently small magnitude of a difference from the phase angle at the bottom dead center, namely, a phase angle that coincides or substantially coincides with the phase angle at the bottom dead center.

According to the present embodiment, the profiles of the intake cams 13L and 13H, the phase angles A11, A12 and A13 at the start of the opening of the intake valve 8, and the phase angles A14, A15, A16 and A17 at the end of opening of the intake valve 8 are set as described above. This arrangement makes it possible to variably set the effective compression ratio of the combustion chamber 3 of each of the cylinders 2, as with the first embodiment, by switching the actual driving intake cam, which opens/closes the intake valve 8, to the intake cam 13L or 13H by the valve lift changing mechanism 11 or by changing the phase angle of the intake cam 13L or 13H by the valve phase changing mechanism 10 thereby to change the valve opening pattern of the intake valve 8 as described above.

For example, in the case where the intake valve 8 is opened/closed by the large lift intake cam 13H, the effective compression ratio of the combustion chamber 3 of each of the cylinders 2 can be continuously increased by continuously changing the phase angle in the state indicated by the dashed line e in FIG. 12, i.e., the utmost phase angle on the lag angle side, toward the phase angle in the state indicated by the solid line f, i.e., the utmost phase angle on the lead angle side.

More specifically, according to the present embodiment, when the intake valve 8 is opened/closed by the large lift intake cam 13H, the phase angle at the end of opening of the intake valve 8 changes toward the phase angle at the bottom dead center within the range on the lag angle side relative to the phase angle at the bottom dead center as the phase angle of the large lift intake cam 13H is changed from the lag angle side to the lead angle side. Thus, the Atkinson-cycle (Miller-cycle) operation of the internal-combustion engine 1, in which the effective compression ratio becomes smaller than an expansion ratio, is achieved when the intake valve 8 is opened/closed by the large lift intake cam 13H. At the same time, as the phase angle of the large lift intake cam 13H is changed from the lag angle side to the lead angle side, the effective compression ratio of the combustion chamber 3 of each of the cylinders 2 increases.

In the case where the intake valve 8 is opened/closed by the small lift intake cam 13L, the effective compression ratio of the combustion chamber 3 of each of the cylinders 2 can be continuously increased by continuously changing the phase angle of the small lift intake cam 13L in the state indicated by the solid line g in FIG. 12, i.e., the utmost phase angle on the lead angle side, toward the phase angle in the state indicated by the dashed line h, i.e., the utmost phase angle on the lag angle side.

More specifically, according to the present embodiment, when the intake valve 8 is opened/closed by the small lift intake cam 13L, the phase angle at the end of opening of the intake valve 8 changes from a phase angle on the lead angle side relative to the phase angle at the bottom dead center toward the phase angle at the bottom dead center as the phase angle of the small lift intake cam 13L is changed from the lead angle side to the lag angle side. Thus, the Atkinson-cycle (Miller-cycle) operation of the internal-combustion engine 1, in which the effective compression ratio becomes smaller than an expansion ratio, is achieved also when the intake valve 8 is opened/closed by the small lift intake cam 13L. At the same time, as the phase angle of the small lift intake cam 13L is changed from the lead angle side to the lag angle side, the effective compression ratio of the combustion chamber 3 of each of the cylinders 2 increases.

In the state indicated by the dashed line h in FIG. 12, the opening of the intake valve 8 will be started and ended at substantially the same phase angles at the top dead center and the bottom dead center, respectively. In this state, the Otto-cycle operation of the internal-combustion engine 1, in which the effective compression ratio is substantially the same as the expansion ratio, is accomplished.

In the present embodiment, the profiles of the intake cams 13L and 13H are set such that the effective compression ratio of the combustion chamber 3 of each of the cylinders 2 will be the same or substantially the same in both the case where the small lift intake cam 13L is used as the actual driving intake cam and the case where the large lift intake cam 13H is used as the actual driving intake cam in a state wherein the phase angles of the intake cams 13L and 13H are controlled to be the utmost phase angles on the lead angle side, i.e., the state wherein the open valve periods of the intake valve 8 actuated by the intake cams 13L and 13H are the open valve periods indicated by the solid lines f and g in FIG. 12.

Hence, the effective compression ratio of the combustion chamber 3 of each of the cylinders 2 or the amount of air charged into the combustion chamber 3 can be maintained at a substantially constant level at the time of switching the actual driving intake cam by switching the actual driving intake cam from one of the intake cams 13L and 13H to the other in the state wherein the phase angles of the intake cams 13L and 13H have been controlled to the utmost phase angles on the lead angle side, which correspond to the states indicated by the solid lines f and g in FIG. 12.

According to the present embodiment, a higher effective compression ratio can be achieved by using the small lift intake cam 13L, as compared with the case where the large lift intake cam 13H is used. For this reason, the large lift intake cam 13H is used as the actual driving intake cam for the low load operation of the internal-combustion engine 1, while the small lift intake cam 13L is used as the actual driving intake cam for the high load operation of the internal-combustion engine 1.

The system construction in the present embodiment, including the constructions of the internal-combustion engine 1 and the system attached thereto, is the same as that of the first embodiment except for the aspects described above.

The control processing by an electronic control unit 50 in the present embodiment will now be described. The electronic control unit 50 in the present embodiment carries out the processing illustrated by the flowchart of FIG. 6 at the startup of the internal-combustion engine 1, as with the case of the first embodiment.

In this case, however, according to the present embodiment, the intake cam for the high load operation is the small lift intake cam 13L, while the intake cam for the low load operation is the large lift intake cam 13H. Therefore, the phase angle θVTC for the actual driving intake cam determined in STEP4 of FIG. 6 is the phase angle of the small lift intake cam 13L. In this case, the desired value of the phase angle θVTC is determined such that the phase angle of the open valve period of the intake valve 8 by the small lift intake cam 13L tends to become a phase angle on the lag angle side as the desired effective compression ratio determined in STEP2 increases.

The startup operation processing in STEP5 is carried out while holding the small lift intake cam 13L as the actual driving intake cam.

The control processing at the time of starting up the internal-combustion engine 1 in the present embodiment is the same as that of the first embodiment except for the aspects described above.

In the intake valve driving mechanism 9 according to the present embodiment, a hydraulic circuit of the valve lift changing mechanism 11 or an urging means, such as a spring, holds the small lift intake cam 13L as the actual driving intake cam at the startup of the internal-combustion engine 1 even if the hydraulic pump using the internal-combustion engine 1 as its driving source is not in operation.

However, if an electric pump is provided as the hydraulic source of the valve lift changing mechanism 11 or if the motive power source of the valve lift changing mechanism 11 is an electric motor, then the small lift intake cam 13L may be retained as the actual driving intake cam by running the electric pump or the electric motor at the time of the startup of the internal-combustion engine 1.

In the operation of the internal-combustion engine 1 after the startup, the electronic control unit 50 carries out the control processing illustrated by the flowchart of FIG. 9, as with the case of the first embodiment.

According to the present embodiment, however, the intake cam for the high load operation and the intake cam for the low load operation are the small lift intake cam 13L and the large lift intake cam 13H, respectively, so that the control processing in STEP14 and STEP16 partly differs from that in the first embodiment.

More specifically, according to the present embodiment, when the internal-combustion engine 1 is operating in the normal mode, in which the switching of the actual driving intake cam is allowed, the electronic control unit 50 determines the desired torque, the desired amount of air, the type of the actual driving intake cam, the desired value of the phase angle θVTC of the actual driving intake cam, and the desired throttle opening degree according to the characteristics indicated by the solid lines in FIGS. 13A to 13E in the control processing in STEP14.

In this case, the desired torque, the desired amount of air, and the desired throttle opening degree are determined in the same manner as that in the first embodiment.

Figure 13A:
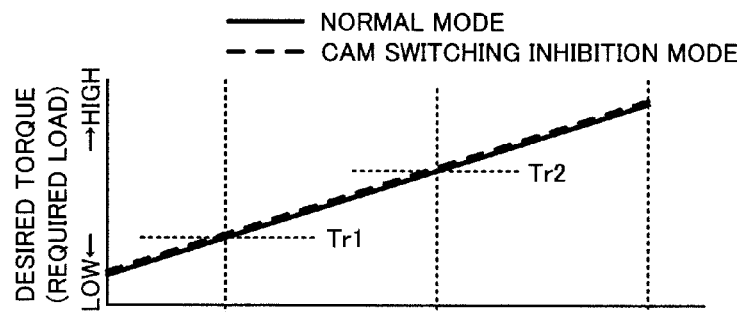
FIG. 13A is a graph illustrating the processing in STEP14 and STEP16 of FIG. 9 in the second embodiment.
Figure 13B:
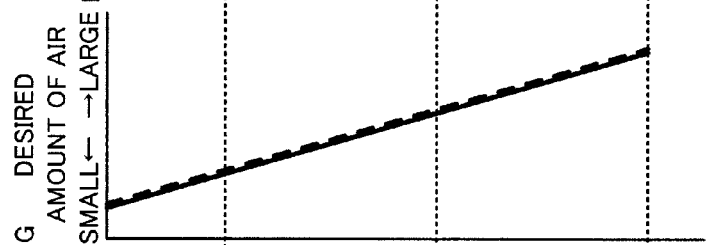
FIG. 13B is a graph illustrating the processing in STEP14 and STEP 16 of FIG. 9 in the second embodiment.
Figure 13C:
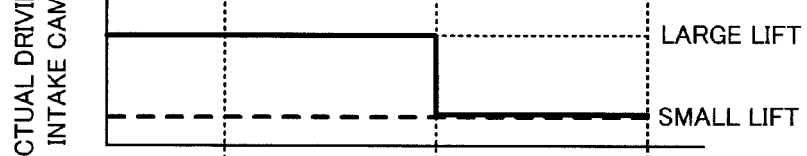
FIG. 13C is a graph illustrating the processing in STEP14 and STEP16 of FIG. 9 in the second embodiment.

Meanwhile, regarding the actual driving intake cam according to the present embodiment, as indicated by the solid line in the graph of FIG. 13C, if the desired torque is smaller than the predetermined value Tr2 (if the required load is relatively low), then the large lift intake cam 13H is determined as the actual driving intake cam. If the desired torque is larger than the predetermined value Tr2 (if the required load is relatively high), then the small lift intake cam 13L is determined as the actual driving intake cam.

Figure 13D:
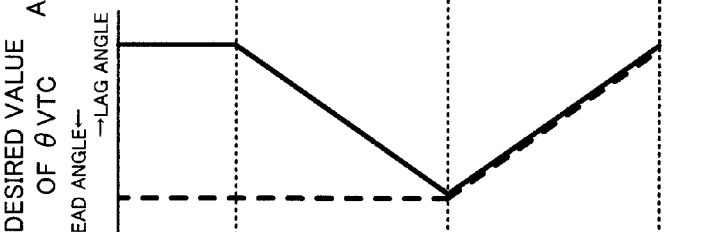
FIG. 13D is a graph illustrating the processing in STEP 14 and STEP 16 of FIG. 9 in the second embodiment.
Figure 13E:
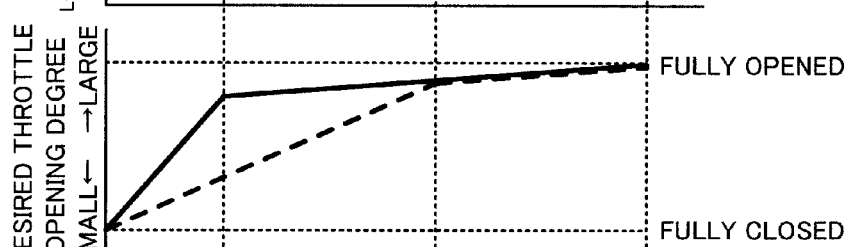
FIG. 13E is a graph illustrating the processing in STEP14 and STEP16 of FIG. 9 in the second embodiment.
Figure 13F:
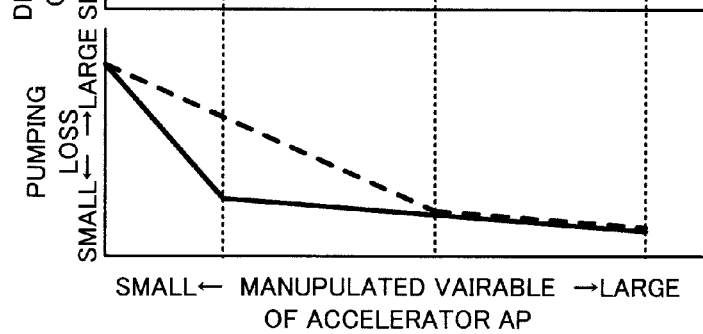
FIG. 13F is a graph illustrating the processing in STEP14 and STEP16 of FIG. 9 in the second embodiment.

Regarding the desired value of the phase angle θVTC of the actual driving intake cam, if the desired torque is larger than the torque Tr2, then the desired value of the phase angle θVTC of the small lift intake cam 13L acting as the actual driving intake cam is determined such that it changes in the lag angle direction from the phase angle corresponding to the state indicated by the solid line g in FIG. 12 (the utmost phase angle on the lead angle side) as the desired torque increases, as indicated by the solid line in the graph of FIG. 13D. In other words, the desired value of the phase angle θVTC of the small lift intake cam 13L is determined such that the effective compression ratio implemented by the opening/closing of the intake valve 8 by the small lift intake cam 13L increases from the effective compression ratio corresponding to the state indicated by the solid line g in FIG. 12 as the desired torque increases.

Further, in the case where the desired torque is smaller than the torque Tr2, if the desired torque is smaller than the torque Tr1 (<Tr2) of the predetermined value, then the desired value of the phase angle θVTC of the large lift intake cam 13H acting as the actual driving intake cam is determined such that, as indicated by the solid line in the graph of FIG. 13D, the desired value of θVTC is maintained at a phase angle corresponding to the situation indicated by the dashed line e in FIG. 12 (the utmost phase angle on the lag angle side). In other words, the desired value of the phase angle θVTC of the large lift intake cam 13H is determined such that the effective compression ratio implemented by the opening/closing of the intake valve 8 by the large lift intake cam 13H is maintained at the effective compression ratio corresponding to the state indicated by the dashed line e in FIG. 12.

Further, if the desired torque falls in the range between the torques Tr1 and Tr2, then the desired value of the phase angle θVTC of the large lift intake cam 13H acting as the actual driving intake cam is determined such that it changes in the lead angle direction from the utmost phase angle on the lag angle side to the utmost phase angle on the lead angle side as the desired torque increases. In other words, the desired value of the phase angle θVTC of the large lift intake cam 13H is determined such that the effective compression ratio implemented by the opening/closing of the intake valve 8 by the large lift intake cam 13H increases from the effective compression ratio corresponding to the state indicated by the dashed line e in FIG. 12 to the effective compression ratio corresponding to the state indicated by the solid line f in FIG. 12 as the desired torque increases.

The control processing in STEP14 in the present embodiment is the same as that in the first embodiment except for the aspects described above.

Further, when the internal-combustion engine 1 is operating in the cam switching inhibition mode, in which the switching of the actual driving intake cam is prohibited, the electronic control unit 50 determines the desired torque, the desired amount of air, the type of the actual driving intake cam, the desired value of the phase angle θVTC of the actual driving intake cam, and the desired throttle opening degree according to the characteristics indicated by the dashed lines in FIG. 13A to FIG. 13E in the control processing in STEP16.

In this case, the desired torque, the desired amount of air, and the desired throttle opening degree are determined in the same manner as that in the first embodiment.

Meanwhile, regarding the actual driving intake cam according to the present embodiment, the electronic control unit 50 holds the small lift intake cam 13L for the high load operation as the intake cam decided to be the actual driving intake cam independently of the desired torque, i.e., independently of the load on the internal-combustion engine 1, as indicated by the dashed line in the graph of FIG. 13C.

Regarding the desired value of the phase angle θVTC of the small lift intake cam 13L acting as the actual driving intake cam, if the desired torque is larger than the torque Tr2 (if the required load is relatively high), then the desired value of the phase angle θVTC of the small lift intake cam 13L is determined to be the same desired value as that in the normal mode, as indicated by the dashed line in the graph of FIG. 13D. Hence, the desired value of the θVTC is determined such that it changes in the lag angle direction from the phase angle corresponding to the state indicated by the solid line g in FIG. 12 as the desired torque increases (such that the effective compression ratio consequently increases from the effective compression ratio corresponding to the state indicated by the solid line g in FIG. 12).

Further, if the desired torque is smaller than the torque Tr2 (if the required load is relatively low), then the desired value of the phase angle θVTC of the small lift intake cam 13L acting as the actual driving intake cam is determined such that, as indicated by the dashed line in the graph of FIG. 13D, the desired value of θVTC is maintained at a phase angle corresponding to the situation indicated by the solid line g in FIG. 12 (the utmost phase angle on the lead angle side). In other words, the desired value of the phase angle θVTC of the small lift intake cam 13L is determined such that the effective compression ratio implemented by the opening/closing of the intake valve 8 by the small lift intake cam 13L is maintained at the effective compression ratio corresponding to the state indicated by the solid line g in FIG. 12.

The control processing in STEP16 in the present embodiment is the same as that of the first embodiment except for the aspects described above.

Supplementarily, the large lift intake cam 13H and the small lift intake cam 13L in the present embodiment correspond to the first intake cam and the second intake cam, respectively, in the seventh to the twelfth aspects of the invention.

Further, the electronic control unit 50 includes the functions as the intake cam switching control unit and the cam phase control unit in the seventh to the twelfth aspects of the invention. In this case, the function as the intake came switching control unit is implemented by the function for holding the small lift intake cam 13L as the actual driving intake cam in the processing illustrated by the flowchart of FIG. 6 and the function for holding the small lift intake cam 13L as the actual driving intake cam in STEP16 if the cam switching inhibition condition is satisfied or for switching the actual driving intake cam, as necessary, in STEP14 if the cam switching inhibition condition is not satisfied in the processing illustrated by the flowchart of FIG. 9.

The function as the cam phase control unit is implemented by the function for variably controlling the phase angle θVTC of the actual driving intake cam in the processing illustrated in FIG. 6 and the function for variably controlling the phase angle θVTC of the actual driving intake cam in STEP 14 and STEP 16 of the flowchart of FIG. 9.

Further, a phase angle A11 shown in FIG. 12 corresponds to the lead angle side valve opening start phase angle in the seventh to the twelfth aspects of the invention. Phase angles A12 and A13 shown in FIG. 12 correspond to the second lag angle side valve opening start phase angle and the first lag angle side valve opening start phase angle in the seventh to the twelfth aspects of the invention.

The state in which the phase angles of the intake cams 13L and 13H have been controlled to the states indicated by the solid lines f and g in FIG. 12 corresponds to the specific state in the present invention. The desired torque of the predetermined value Tr2 shown in FIG. 13 corresponds to the cam switching load in the seventh to the twelfth aspects of the invention.

According to the present embodiment described above, while the internal-combustion engine 1 is operating in the normal mode, the operational state of the intake valve 8, namely, the phase angle and the lift amount in the open valve period, change as follows according to the load on the internal-combustion engine 1, i.e., the desired torque.

For example, in the case where the load on the internal-combustion engine 1 increases from the low load side to the high load side, the large lift intake cam 13H is used as the actual driving intake cam in the state wherein the load on the internal-combustion engine 1 is relatively low, i.e., in the state wherein the desired torque is smaller than the predetermined value Tr2. When the desired torque exceeds the predetermined value Tr1, the phase angle θVTC of the large lift intake cam 13H continuously changes from the lag angle side to the lead angle side as the load on the internal-combustion engine 1 increases.

Hence, the operational state of the intake valve 8 continuously changes from the state indicated by the dashed line e to the state indicated by the solid line f in FIG. 12 (refer to an arrow Y4 in FIG. 12). Thus, the effective compression ratio of the combustion chamber 3 of each of the cylinders 2 increases.

Thereafter when the phase angle θVTC of the large lift intake cam 13H advances to the utmost phase angle on the lead angle side, causing the operational state of the intake valve 8 to reach the state indicated by the solid line f in FIG. 12, the actual driving intake cam is switched from the large lift intake cam 13H to the small lift intake cam 13L. At this time, the phase angle θVTC of the small lift intake cam 13L also reaches the utmost phase angle on the lead angle side. Thus, the operational state of the intake valve 8 is changed from the state indicated by the solid line f to the state indicated by the solid line g in FIG. 12, causing the lift amount to decrease and also the angle width in the open valve period to decrease (refer to an arrow Y5 in FIG. 12).

In this case, in the state wherein the θVTC has advanced to the utmost phase angle on the lead angle side, the effective compression ratio of the combustion chamber 3 of each of the cylinders 2 and consequently the amount of air charged into the combustion chamber 3 will be the same or substantially the same in both the case where the small lift intake cam 13L is used as the actual driving intake cam and the case where the large lift intake cam 13H is used as the actual driving intake cam, as described above.

Therefore, when the actual driving intake cam is switched, the amount of air charged into the combustion chamber 3 of each of the cylinders 2 will be maintained substantially at a constant level before and after the switching. Further, there will be no sudden change in the phase angles of the intake cams 13L and 13H before and after the switching. As a result, switching the actual driving intake cam will not cause discontinuous fluctuations (stepped fluctuations) in the output torque of the internal-combustion engine 1. In addition, the switching can be promptly completed.

Further, the phase angle at the start of the opening of the intake valve 8 immediately before the actual driving intake cam is switched and the phase angle at the start of the opening of the intake valve 8 immediately after the switching are both on the lead angle side relative to the top dead center and substantially agree with each other (both are the phase angle A11 in the present embodiment). This obviates a sudden change in the amount of an exhaust gas (an exhaust gas recirculated by the EGR unit 25 or an exhaust gas emitted from the combustion chamber 3 during an exhaust stroke immediately before an intake stroke) charged together with air into the combustion chamber 3 of each of the cylinders 2 during the open valve period of the intake valve 8 before and after the switching.

Further, according to the present embodiment, after the actual driving intake cam is switched to the small lift intake cam 13L because of an increase in the load, i.e., an increase in the desired torque, of the internal-combustion engine 1, the phase angle θVTC of the small lift intake cam 13L continuously changes from the lead angle side to the lag angle side as the load, i.e., the desired torque, of the internal-combustion engine 1 increases. Hence, the operational state of the intake valve 8 continuously changes from the state indicated by the solid line g to the state indicated by the dashed line h in FIG. 12 (refer to an arrow Y6 in FIG. 12). This causes the effective compression ratio of the combustion chamber 3 of each of the cylinders 2 to further increase.

As described above, according to the present embodiment, when the load on the internal-combustion engine 1 increases from the low load side to the high load side while the internal-combustion engine 1 is running in the normal mode, the effective compression ratio of the combustion chamber 3 of each of the cylinders 2 and the amount of air charged into the combustion chamber 3 during the open valve period of the intake valve 8 smoothly increase without changing in steps. Moreover, a sudden change in steps in the amount of the exhaust gas charged into the combustion chamber 3 of each of the cylinders 2 before and after the switching of the actual driving intake cam will be prevented.

As a result, the output torque of the internal-combustion engine 1 can be smoothly increased without causing the occurrence of a misfire of the internal-combustion engine 1, as with the first embodiment.

In the case where the load on the internal-combustion engine 1 decreases from the high load side to the low load side while the internal-combustion engine 1 is running in the normal mode, the change in the operational state of the intake valve 8 will be reversed from that in the case where the load on the internal-combustion engine 1 increases. More specifically, in the case of the high load operation of the internal-combustion engine 1, the intake valve 8 is opened/closed by the small lift intake cam 13L. Further, the phase angle of the intake valve 8 in the open valve period changes in the lead angle direction from the state indicated by the dashed line h to the state indicated by the solid line g in FIG. 12 as the load on the internal-combustion engine 1 decreases.

Then, the actual driving intake cam is switched from the small lift intake cam 13L to the large lift intake cam 13H in the state wherein the phase angles θVTC of both intake cams 13L and 13H have been controlled to the phase angles (the utmost phase angles on the lead angle side) corresponding to the states indicated by the solid lines g and f, respectively.

In the low load operation of the internal-combustion engine 1 thereafter, the intake valve 8 is opened/closed by the large lift intake cam 13H. Further, the phase angle of the intake valve 8 in the open valve period changes in the lag angle direction from the state indicated by the solid line f to the state indicated by the dashed line e in FIG. 12 as the load on the internal-combustion engine 1 decreases.

Thus, also when the load on the internal-combustion engine 1 decreases from the high load side to the low load side, the effective compression ratio of the combustion chamber 3 of each of the cylinders 2 or the amount of air charged into the combustion chamber 3 during the open valve period of the intake valve 8 smoothly decreases without changing in steps, as with the case where the load increases. Moreover, a sudden change in steps in the amount of the exhaust gas charged into the combustion chamber 3 of each of the cylinders 2 will be prevented before and after the switching of the actual driving intake cam. As a result, the output torque of the internal-combustion engine 1 can be smoothly decreased without causing the occurrence of a misfire of the internal-combustion engine 1.

As the load on the internal-combustion engine 1 increases or decreases, the effective compression ratio of the combustion chamber 3 of each of the cylinders 2 increases or decreases accordingly. This makes it possible to restrain the change amount of the throttle valve 7 relative to the change in the load on the internal-combustion engine 1. As a result, the opening degree of the throttle valve 7 can be maintained at full throttle or a large opening degree in the vicinity thereof over an extensive load range of the internal-combustion engine 1 (specifically, a load range in which the desired torque is Tr1 or more), thus making it possible to reduce the pumping loss of the internal-combustion engine 1 thereby to restrain fuel consumption.

Further, when the internal-combustion engine 1 is operating in the cam switching inhibition mode, i.e., when the internal-combustion engine 1 is operating in a low temperature environment, in which the engine temperature TW of the internal-combustion engine 1 or the intake temperature TA (the ambient temperature) is relatively low, the use of the large lift intake cam 13H for the low load operation is prohibited, and the small lift intake cam 13L for the high load operation is held as the actual driving intake cam.

Hence, the effective compression ratio of the combustion chamber 3 of each of the cylinders 2 of the internal-combustion engine 1 is always maintained at a relatively high compression ratio equal to or higher than the effective compression ratio that corresponds to the state indicated by the solid line g in FIG. 12. This leads to a sufficient temperature rise attributable to the compression of air charged into the combustion chamber 3 of each of the cylinders 2 also in the low load operation as well as the high load operation of the internal-combustion engine 1, as with the first embodiment. As a result, the occurrence of a misfire of the fuel supplied to the combustion chamber 3 can be prevented, thus allowing the proper operation of the internal-combustion engine 1 to be stably accomplished.

When the internal-combustion engine 1 is operating in the cam switching inhibition mode under a high load, in which the desired torque exceeds the predetermined value Tr2, the effective compression ratio is changed by changing the phase angle θVTC of the small lift intake cam 13L, as with the normal mode. This makes it possible to maintain the opening degree of the throttle valve 7 at a full throttle or an opening degree in the vicinity thereof. Thus, the pumping loss can be reduced and the fuel consumption can be therefore restrained.

At the startup of the internal-combustion engine 1, the small lift intake cam 13L for the high load operation is held as the actual driving intake cam, as with the case of the operation of the internal-combustion engine 1 in the cam switching inhibition mode.

Thus, in the case where the engine temperature TW or the intake temperature TA (ambient temperature) is relatively low or in the case where the intake pressure PB (atmosphere pressure) is relatively low, the phase angle of the small lift intake cam 13L acting as the actual driving intake cam is controlled such that the effective compression ratio of the combustion chamber 3 of each of the cylinders 2 of the internal-combustion engine 1 becomes a large compression ratio.

Hence, as with the first embodiment, even when the internal-combustion engine 1 is started up in a low temperature environment, such as a cold place or the winter, or in a low pressure environment, such as a place at a high altitude, the temperature of the air charged into the combustion chamber 3 of each of the cylinders 2 can be sufficiently increased by the compression thereof. This permits a smooth start of the combustion of the fuel mixed in the air.

In the case where the engine temperature TW or the intake temperature TA (ambient temperature) is relatively high or in the case where the intake pressure PB (atmosphere pressure) is relatively low, the phase angle of the small lift intake cam 13L acting as the actual driving intake cam is controlled such that the effective compression ratio of the combustion chamber 3 of each of the cylinders 2 of the internal-combustion engine 1 becomes a small compression ratio.

Thus, as with the first embodiment, it is possible to prevent the temperature of the air charged into the combustion chamber 3 of each of the cylinders 2 from excessively rising due to the compression thereof in a high temperature environment, such as a condition immediately after the operation of the internal-combustion engine 1 is stopped, or at the startup of the internal-combustion engine 1 in a high pressure environment. As a result, the occurrence of knocking or the like due to abnormal combustion of the fuel mixed in the air can be prevented.

What is claimed is:

1. A controller for an internal-combustion engine, comprising:

an intake valve driving mechanism that has a first intake cam and a second intake cam selectively used to open/close an intake valve, a valve lift changing mechanism that selectively switches an actual driving intake cam, which is an intake cam actually opening/closing the intake valve, to either the first intake cam or the second intake cam, and a valve phase changing mechanism that changes the phase angles of the first and the second intake cams relative to the phase angle of a crankshaft, the profiles of the first and the second intake cams being set such that, in the case where the intake valve is opened/closed by the first intake cam, the lift amount of the intake valve and the angle width of an open valve period are both larger than those in the case where the intake valve is opened/closed by the second intake cam, the profiles of the first and the second intake cams being set such that the angle width in the open valve period of the intake valve driven by the second intake cam becomes an angle width that is smaller than an angle width between a top dead center and a bottom dead center and the angle width in the open valve period of the intake valve driven by the first intake cam becomes an angle width that is closer to the angle width between the top dead center and the bottom dead center than the angle width in the open valve period of the intake valve driven by the second intake cam, an intake cam switching control unit, which defines the first intake cam out of the first and the second intake cams as the intake cam for a high load operation of the internal-combustion engine and defines the second intake cam as the intake cam for a low load operation of the internal-combustion engine, controls the valve lift changing mechanism to switch the actual driving intake cam according to the load on the internal-combustion engine while the internal-combustion engine is in operation, and holds the first intake cam as the actual driving intake cam by the valve lift changing mechanism at the time of starting up the internal-combustion engine; and a cam phase control unit, which controls the valve phase changing mechanism to change the phase angle of the actual driving intake cam according to the load on the internal-combustion engine while the internal-combustion engine is in operation, and controls the valve phase changing mechanism to change the phase angle of the actual driving intake cam in a predetermined pattern according to at least one of a temperature of the internal-combustion engine, the temperature of the atmosphere, and the pressure of the atmosphere at the time of starting up the internal-combustion engine, wherein, during the operation of the internal-combustion engine, the cam phase control unit controls the valve phase changing mechanism such that, at the time of opening/closing the intake valve by the first intake cam, the phase angle at the start of the opening of the intake valve changes in a lead angle direction within a range between a predetermined first lag angle side valve opening start phase angle that is on the lag angle side relative to the top dead center and on a lead angle side relative to the bottom dead center and a predetermined first lead angle side valve opening start phase angle that is on the lead angle side relative to the first lag angle side valve opening start phase angle as the load on the internal-combustion engine increases, and also controls the valve phase changing mechanism such that, at the time of opening/closing the intake valve by the second intake cam, the phase angle at the start of the opening of the intake valve changes in a lag angle direction within a range between a predetermined second lag angle side valve opening start phase angle that is on a lag angle side relative to the top dead center and on the lead angle side relative to the bottom dead center and a predetermined second lead angle side valve opening start phase angle on the lead angle side relative to the second lag angle side valve opening start phase angle as the load on the internal-combustion engine increases, the intake cam switching control unit switches the actual driving intake cam in a specific state, in which the phase angle of the first intake cam and the phase angle of the second intake cam are controlled such that a phase angle at a start of opening of the intake valve by the first intake cam agrees with the first lag angle side valve opening start phase angle, and that a phase angle at a start of opening of the intake valve by the second intake cam agrees with the second lag angle side valve opening start phase angle while the internal-combustion engine is in operation, the first lag angle side valve opening start phase angle and the first lead angle side valve opening start phase angle are set beforehand such that the effective compression ratio of a combustion chamber of the internal-combustion engine increases as the phase angle at the opening start of the intake valve changes in the lead angle direction within the range between the first lag angle side valve opening start phase angle and the first lead angle side valve opening start phase angle, and the second lag angle side valve opening start phase angle and the second lead angle side valve opening start phase angle are set beforehand such that the effective compression ratio of the combustion chamber increases as the phase angle at the opening start of the intake valve changes in the lag angle direction within the range between the second lag angle side valve opening start phase angle and the second lead angle side valve opening start phase angle.

2. The controller for the internal-combustion engine according to claim 1, wherein the cam phase control unit is capable of controlling the valve phase changing mechanism to change the phase angle of the actual driving intake cam according to at least one of the temperature of the internal-combustion engine and the temperature of the atmosphere at the time of starting up the internal-combustion engine, and also controls the valve phase changing mechanism according to at least one of the temperature of the internal-combustion engine and the temperature of the atmosphere such that the effective compression ratio of the combustion chamber defined by the phase angle of the actual driving intake cam is larger in the case where the temperature of the internal-combustion engine or the temperature of the atmosphere at the startup of the internal-combustion engine is relatively low than in the case where the temperature of the internal-combustion engine or the temperature of the atmosphere at the startup of the internal-combustion engine is relatively high.

3. The controller for the internal-combustion engine according to claim 1, wherein the cam phase control unit is capable of controlling the valve phase changing mechanism to change the phase angle of the actual driving intake cam according to the pressure of the atmosphere at the time of starting up the internal-combustion engine, and controls the valve phase changing mechanism according to the pressure of the atmosphere such that the effective compression ratio of the combustion chamber defined by the phase angle of the actual driving intake cam is larger in the case where the pressure of the atmosphere at the startup of the internal-combustion engine is relatively low than in the case where the pressure of the atmosphere at the startup of the internal-combustion engine is relatively high.

4. The controller for the internal-combustion engine according to claim 1, wherein the intake cam switching control unit holds the first intake cam as the actual driving intake cam by the valve lift changing mechanism in the case where at least one or both of the temperature of the internal-combustion engine and the temperature of the atmosphere satisfies a predetermined cam switching inhibition condition for prohibiting the use of the second intake cam as the actual driving intake cam during the operation of the internal-combustion engine, whereas the intake cam switching control unit controls the valve lift changing mechanism to switch the actual driving intake cam according to a load on the internal-combustion engine in the case where the cam switching inhibition condition is not satisfied.

5. The controller for the internal-combustion engine according to claim 4, wherein in a case where a load on the internal-combustion engine corresponding to the specific state, in which the intake cam switching control unit switches the actual driving intake cam, is defined as a cam switching load in a state wherein the cam switching inhibition condition is not satisfied, the cam phase control unit controls the valve phase changing mechanism to maintain the phase angle of the first intake cam to be the first lag angle side valve opening start phase angle in the case where the load on the internal-combustion engine is lower than the cam switching load or the cam phase control unit controls the valve phase changing mechanism to change the phase angle of the first intake cam in a lead angle direction between the first lag angle side valve opening start phase angle and the first lead angle side valve opening start phase angle as the load on the internal-combustion engine increases in the case where the load on the internal-combustion engine is higher than the cam switching load in a state which satisfies the cam switching inhibition condition, and the controller further comprises a throttle control unit which controls the opening degree of a throttle valve provided in an intake passage of the internal-combustion engine to be smaller than that in the case where the cam switching inhibition condition is not satisfied in the case where the load on the internal-combustion engine is lower than the cam switching load in the state which satisfies the cam switching inhibition condition, and also control the opening degree of the throttle valve to the same opening degree as that in the case where the cam switching inhibition condition is not satisfied in the case where the load on the internal-combustion engine is higher than the cam switching load.

6. The controller for the internal-combustion engine according to claim 1,
wherein the profiles of the first and the second intake cams are set such that the effective compression ratio of the combustion chamber of the internal-combustion engine in the case where the intake valve is opened/closed by the first intake cam and the effective compression ratio in the case where the intake valve is opened/closed by the second intake cam agree with each other in the specific state.

* * * * *